United States Patent
Kusaka

(10) Patent No.: US 7,349,112 B2
(45) Date of Patent: Mar. 25, 2008

(54) PRINTING-OBJECT IMAGE DESIGNATION DEVICE

(75) Inventor: Hiroya Kusaka, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 830 days.

(21) Appl. No.: 10/168,267

(22) PCT Filed: Oct. 25, 2001

(86) PCT No.: PCT/JP01/09402

§ 371 (c)(1),
(2), (4) Date: Oct. 8, 2002

(87) PCT Pub. No.: WO02/037291

PCT Pub. Date: Oct. 5, 2002

(65) Prior Publication Data

US 2003/0090710 A1 May 15, 2003

(30) Foreign Application Priority Data

Oct. 26, 2000 (JP) .............................. 2000-326589

(51) Int. Cl.
*G06F 3/12* (2006.01)
*G06F 13/00* (2006.01)
(52) U.S. Cl. ........................ 358/1.15; 358/1.16; 710/33
(58) Field of Classification Search ................ 358/1.15, 358/1.12, 402, 1.16, 1.17; 455/566; 710/3, 710/8, 33; 709/217, 234, 204; 348/207.1, 348/207.11, 207.2, 211.2

See application file for complete search history.

(56) References Cited

U.S. PATENT DOCUMENTS

| 5,095,445 | A |   | 3/1992 | Sekiguchi |
|---|---|---|---|---|
| 5,493,335 | A |   | 2/1996 | Parulski et al. |
| 5,537,626 | A | * | 7/1996 | Kraslavsky et al. ........... 710/8 |
| 5,649,149 | A | * | 7/1997 | Stormon et al. ............ 711/108 |
| 5,802,314 | A |   | 9/1998 | Tullis et al. |
| 5,806,005 | A |   | 9/1998 | Hull et al. |
| 5,933,478 | A |   | 8/1999 | Ozaki et al. |
| 6,141,111 | A |   | 10/2000 | Kato |

(Continued)

FOREIGN PATENT DOCUMENTS

EP        0 689 206 A1    12/1995

(Continued)

OTHER PUBLICATIONS

Japanese search report for PCT/JP01/09402 dated Dec. 25, 2001.

(Continued)

*Primary Examiner*—Scott A. Rogers
(74) *Attorney, Agent, or Firm*—RatnerPrestia

(57) ABSTRACT

A user, upon specifying a print control file as a file to be transmitted, an image file to be printed listed in the control file is also specified as a file to be transmitted, and the image file is listed into a transmission control file. This enables the user to transmit the image file without transmitting it separately. A file specifying apparatus employs a memory storing the image file and image file information that specifies the image file. The apparatus is used together with a transmitter that transmits the image file to a destination device for printing the image file. The apparatus includes a reading unit for reading the image file information from the memory and a controller for adding print control file information into the transmission control file. The print control file information specifies the print control file including the image file information read out.

33 Claims, 20 Drawing Sheets

U.S. PATENT DOCUMENTS

| | | |
|---|---|---|
| 6,181,870 B1 | 1/2001 | Okada et al. |
| 6,442,252 B1 | 8/2002 | Fujise et al. |
| 6,573,927 B2 | 6/2003 | Parulski et al. |
| 6,650,343 B1 | 11/2003 | Fujita et al. |
| 6,715,003 B1 * | 3/2004 | Safai ............................ 710/33 |
| 6,784,924 B2 | 8/2004 | Ward et al. |
| 2003/0007189 A1 | 1/2003 | Kusaka et al. |
| 2003/0012559 A1 | 1/2003 | Kusaka et al. |
| 2003/0018717 A1 * | 1/2003 | Haley et al. ................. 709/205 |
| 2005/0088690 A1 * | 4/2005 | Haneda et al. ............. 358/1.15 |
| 2005/0144189 A1 * | 6/2005 | Edwards et al. ............ 707/102 |
| 2007/0041714 A1 | 2/2007 | Kusaka et al. |

FOREIGN PATENT DOCUMENTS

| | | |
|---|---|---|
| EP | 0 730 272 A2 | 9/1996 |
| EP | 0 838 774 A2 | 4/1998 |
| EP | 0 860 829 A2 | 8/1998 |
| EP | 0 860 980 A2 | 8/1998 |
| EP | 0 912 036 A2 | 4/1999 |
| EP | 0 965 991 A1 | 12/1999 |
| EP | 0 994 480 A1 | 4/2000 |
| JP | 05-274232 A | 10/1993 |
| JP | 06-214904 A | 8/1994 |
| JP | 07-114634 | 5/1995 |
| JP | 07-184106 | 7/1995 |
| JP | 08-115278 A | 5/1996 |
| JP | 08-242326 | 9/1996 |
| JP | 09-146918 | 6/1997 |
| JP | 09-179806 | 7/1997 |
| JP | 10-051733 | 2/1998 |
| JP | 10-097639 A | 4/1998 |
| JP | 10-224745 A | 8/1998 |
| JP | 10-234002 | 9/1998 |
| JP | 10-283759 | 10/1998 |
| JP | 10-304292 | 11/1998 |
| JP | 11-055324 A | 2/1999 |
| JP | 11-088808 | 3/1999 |
| JP | 11-143803 | 5/1999 |
| JP | 11-232440 A | 8/1999 |
| JP | 11-313273 | 11/1999 |
| JP | 2000-029800 A | 1/2000 |
| JP | 2000-041212 A | 2/2000 |
| JP | 2000-276418 | 10/2000 |
| WO | 99/48289 | 9/1999 |

OTHER PUBLICATIONS

English translation of Form PCT/ISA/210.
International Search Report for Application No. PCT/JP01/01999, dated May 29, 2001.
Supplementary European Search Report for Application No. EP 01 91 2342, dated Aug. 29, 2006.
International Search Report for Application No. PCT/JP01/02000, dated Jun. 12, 2001.
European Search Report for Application No. EP 01 91 2343, dated Jul. 10, 2006.

* cited by examiner

FIG. 4

| Line | Content |
|---|---|
| PRINT 1 | A.JPG |
| PRINT 2 | B.JPG |

FIG. 8

| Line | Content |
|------|---------|
| 1 | SEND_SRC="PRINT1" |
| 2 | SEND_ADR="AAA@BBB.ne.jp" |
| 3 | USR_ADR="CCC@DDD.com" |
| 4 | USR_TEL="8166YYYYYY" |
| 5 | SEND_TTL="Hello" |
| 6 | SEND_MSG="Good Morning!" |
| 7 | USR_NAM="TARO NIPPON" |
| 8 | SEND_SRC="A.JPG" |
| 9 | SEND_SRC="B.JPG" |

FIG. 12

| Line | Content |
|---|---|
| 1 | SEND_SRC="PRINT1" |
| 2 | SEND_ADR="AAA@BBB.ne.jp" |
| 3 | USR_ADR="CCC@DDD.com" |
| 4 | USR_TEL="8166YYYYYYY" |
| 5 | SEND_TTL="Hello" |
| 6 | SEND_MSG="Good Morning!" |
| 7 | USR_NAM="TARO NIPPON" |

FIG. 16

| Line | Content |
|---|---|
| 1 | GID=001 |
| 2 | SEND_SRC="PRINT2" |
| 3 | SEND_ADR="AAA@BBB.ne.jp" |
| 4 | USR_ADR="CCC@DDD.com" |
| 5 | USR_TEL="8166YYYYYY" |
| 6 | SEND_TTL="Hello" |
| 7 | SEND_MSG="Good Morning!" |
| 8 | USR_NAM="TARO NIPPON" |
| 9 | SEND_SRC=A.JPG |
| 10 | GID=002 |
| 11 | SEND_SRC="PRINT3" |
| 12 | SEND_ADR="EEE@FFF.ne.jp" |
| 13 | USR_ADR="CCC@DDD.com" |
| 14 | USR_TEL="8166YYYYYY" |
| 15 | SEND_TTL="Bye" |
| 16 | SEND_MSG="Thank You" |
| 17 | USR_NAM="TARO NIPPON" |
| 18 | SEND_SRC=B.JPG |

FIG. 17

| Line | Content |
|---|---|
| 1 | GID=001 |
| 2 | SEND_SRC="PRINT2" |
| 3 | SEND_ADR="AAA@BBB.ne.jp" |
| 4 | USR_ADR="CCC@DDD.com" |
| 5 | USR_TEL="8166YYYYYY" |
| 6 | SEND_TTL="Hello" |
| 7 | SEND_MSG="Good Morning!" |
| 8 | USR_NAM="TARO NIPPON" |
| 9 | GID=002 |
| 10 | SEND_SRC="PRINT3" |
| 11 | SEND_ADR="EEE@FFF.ne.jp" |
| 12 | USR_ADR="CCC@DDD.com" |
| 13 | USR_TEL="8166YYYYYY" |
| 14 | SEND_TTL="Bye" |
| 15 | SEND_MSG="Thank You" |
| 16 | USR_NAM="TARO NIPPON" |

PRINTING-OBJECT IMAGE DESIGNATION DEVICE

CROSS-RELATED APPLICATIONS

This application is a U.S. National Phase Application of PCT International Application PCT/JP01/09402.

TECHNICAL FIELD

The present invention relates to an apparatus for specifying an image selected arbitrarily as an image to be printed by a user from images obtained with a digital still camera or a digital video camera, and to a transmitter for transmitting the image to be printed.

BACKGROUND ART

A system, with which a user selects an image to be printed from images captured with a digital camera, is disclosed in Japanese Patent Laid-Open No.11-88808. As shown in FIG. 19, the user selects a file to be printed from images in image-file 1901. The images were captured with pick-up means 1903 and stored in image-file 1901. The resultant selection is stored in print-control file 1902 by print-control storing means 1905. Print-control file 1902 lists names and others of image files to be printed. A printer capable of decoding file 1902 prints the objective image file according to descriptions of file 1902.

The publication No.11-88808 also discloses a system for transmitting an image file specified by a user. As shown in FIG. 20, a name of image file 2001 selected by a user with a digital camera is stored in communication control file 2002 in a flash memory card. Communication control means 2005 obtains, via communication-control-information-obtaining means 2004, a file name of an image file to be transmitted from the memory card to the outside through communication. Then control means 2005 instructs communication means 2003 to transmit the image file in turn.

In the conventional system discussed above, when a user prints an image file using a print control file, the user has to connect the memory card, storing the print control file and the image file to be printed, directly to a printer capable of decoding print control file 1902. For instance, when the user asks a third party at a remote place to print the image file, the user has to send the memory card storing the image file and the print control file to the destination by delivery means such as a mail service. This is inconvenient for the users.

The image file to be printed may be transmitted to the third party with the system shown in FIG. 20, and the control file may be transmitted by another means such as e-mail to the third party. However, in this case, the user has to select the file to be transmitted in order to transmit the image file to be printed, further, the user has to additionally select the file to be printed in order to create the print control file. Therefore, the user is obliged to carry out the file selections twice, namely, for specifying the file to be transmitted and specifying the file to be printed. This is also inconvenient for the users.

SUMMARY OF THE INVENTION

For transmitting an image file according to a print control file to a device at a remote destination for printing or displaying the image file, a user only specifies, as a file to be transmitted, the print control file created by a user. An apparatus for specifying an image to be printed instructs to transmit an image file necessary for printing is provided.

The apparatus uses a memory for storing the image file and image file information which specifies the file. The apparatus for specifying an image to be printed is used together with a transmitter for transmitting, to a destination device, the file specified by file information included in a transmission control file.

The apparatus for specifying an image to be printed includes a reading unit for reading the image file information from the memory, and a controller for adding print control file information into the transmission control file. The print control file information specifies the print control file including the image file information read out.

BRIEF DESCRIPTION OF THE DRAWINGS

FIG. 4 shows the content of print control file 105 in accordance with embodiment 1.

FIG. 8 shows the content of transmission control file 104 in accordance with embodiment 1.

FIG. 12 shows the content of transmission control file 104 in accordance with embodiment 2.

FIG. 16 shows the content of transmission control file 104 in accordance with embodiment 3.

FIG. 17 shows the content of transmission control file 104 in accordance with exemplary embodiment 4 of the present invention.

DETAILED DESCRIPTION OF PREFERRED EMBODIMENTS

Exemplary Embodiment 1

Figure 1:
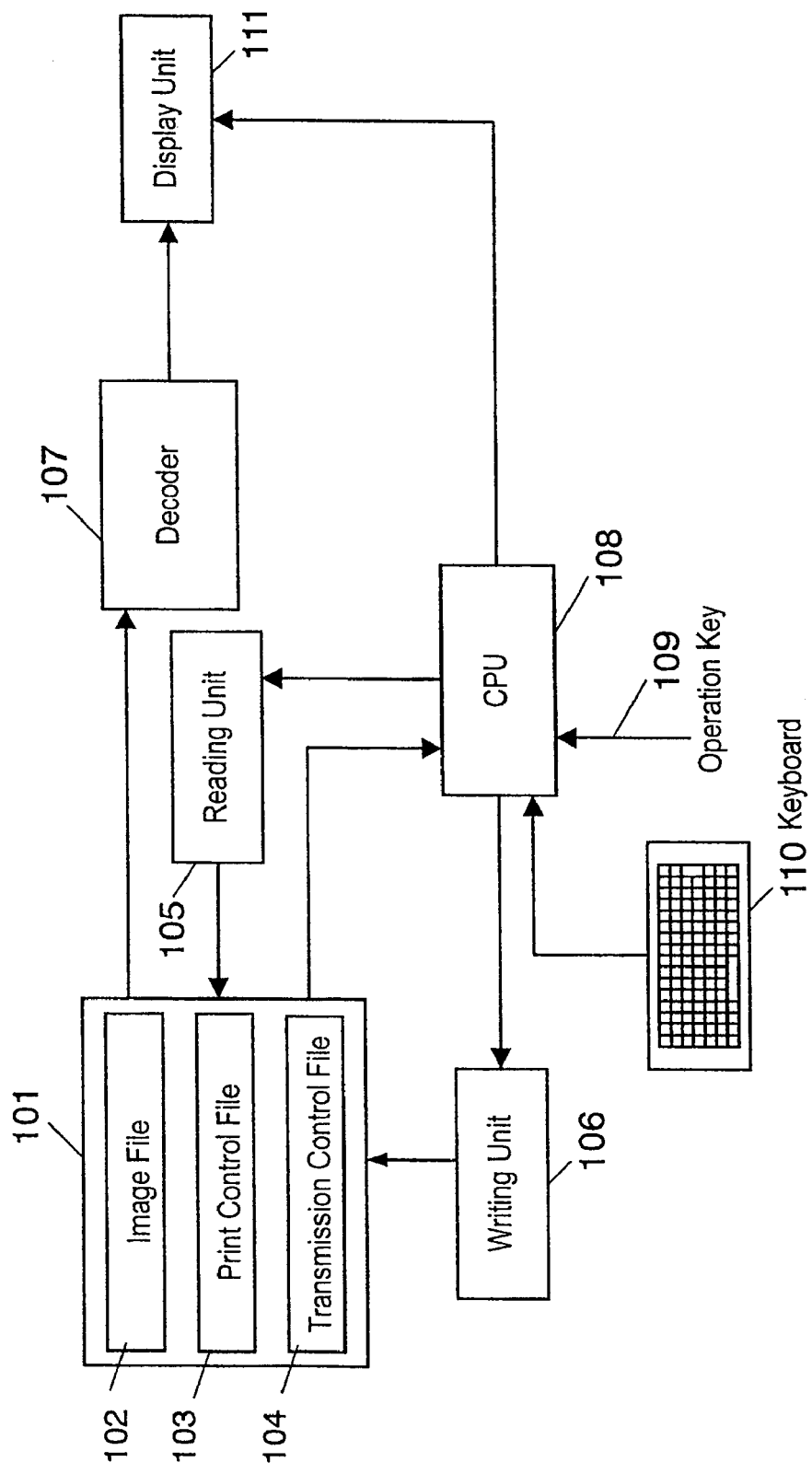
FIG. 1 is a block diagram of an apparatus of a print-image specifying/transmitting system in accordance with exemplary embodiment 1 of the present invention. The apparatus generates a print control file specifying an image to be printed, and a transmission control file for controlling a file transmission.

FIG. 1 is a block diagram of an apparatus of a print image specifying/transmitting system in accordance with exemplary embodiment 1 of the present invention. The apparatus creates a print control file for specifying an image to be printed and a transmission control file for controlling a file transmission.

Memory 101 stores digital data of images obtained and coded by a pick-up device such as a digital still camera, a digital video camera, or a scanner. Memory 101 is detachable like a flash memory card. Image file 102 holds image data stored in memory 101. Print control file 103 holds information of the file to be printed for printing image file 102. Thus file 103 functions similarly to that disclosed in the prior art (11-88808) and produces a similar advantage to that. Transmission control file 104 holds information such as names of files to be transmitted, sender addresses, and receiver addresses for transmitting image file 102 and print control file 103. In FIG. 1, one of image file 102, one of print control file 103, and one of transmission control file 104 are shown in order to be simply described. The present invention is not limited to what is shown in FIG. 1, and actually, plural files may be available.

Reading unit 105 reads files stored in memory 101, writing unit 106 writes print control file 103 and transmission control file 104 into memory 101. Decoder 107 decodes image file 102 to reproduce an image, and displays file names other than the image file on display unit 111. CPU 108 creates and edits print control file 103 and transmission control file 104 responsive to inputs through operating keys 109 or keyboard 110, and controls reading unit 105, thereby controlling the read-out of image files and the display of menus on display unit 111. Display unit 111 may be a display device such as an LCD or a CRT for displaying image signals decoded by decoder 107.

Figure 2:
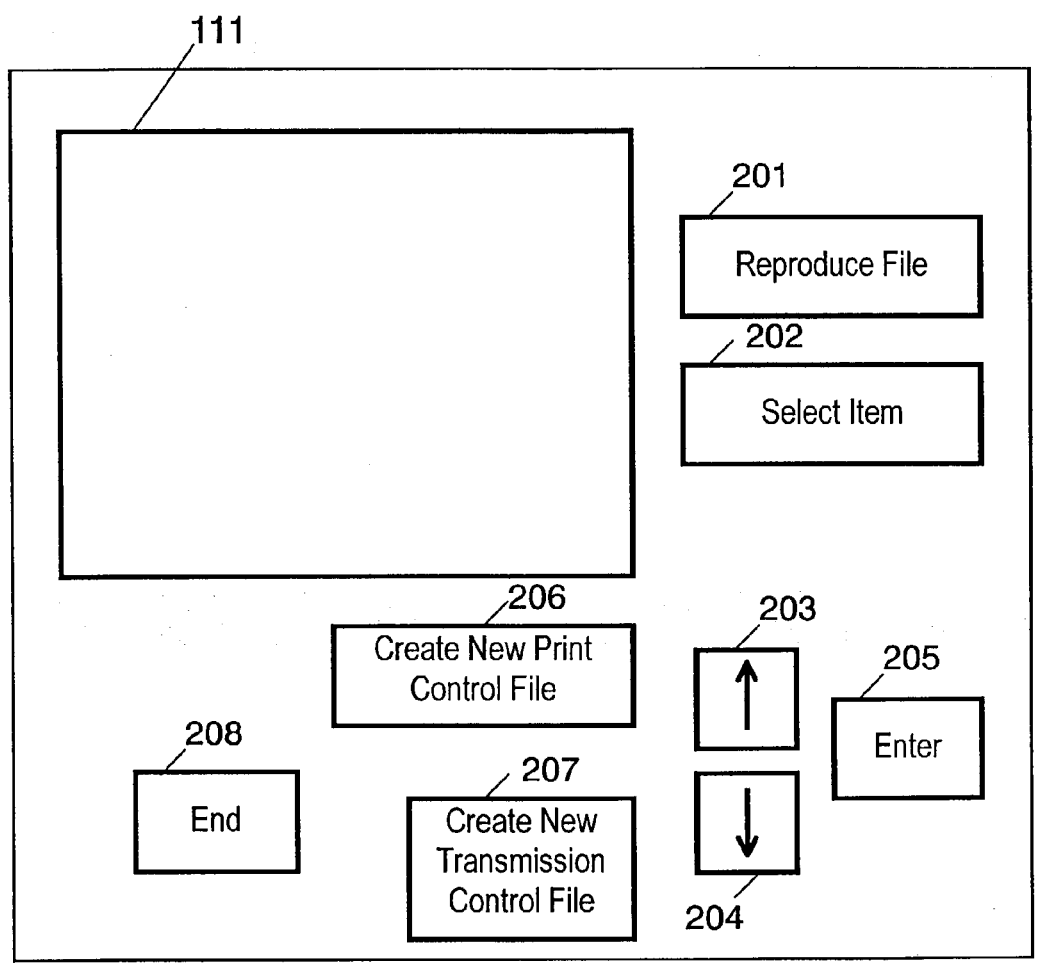
FIG. 2 shows an operation panel of the apparatus shown in FIG. 1.

FIG. 2 shows an operation panel of the apparatus shown in FIG. 1. Keys 201 to 208 constitute operating keys 109 shown in FIG. 1, and input signals through the keys are sent to CPU 108 shown in FIG. 1. Respective functions of the keys will be described hereinafter.

File reproduction mode selection key 201: When this key is depressed, the apparatus turns to a mode of reproducing various files stored in memory 101. CPU 108 controls reading unit 105 for reading a file from all the files stored in memory 101, decodes image file 102 for reproducing the image, and displays file names other than the image file on display unit 111;

Specified Item Selecting key 202: When this key is depressed, the apparatus turns to a mode of selecting an item listed in transmission control file 104;

Feeding key 203;

Reverting key 204;

Enter key 205;

New Print Control File Creating key 206: When this key is depressed, CPU 108 controls writing unit 106 for newly creating print control file 103 in memory 101;

New Transmission Control File Creating key 207: When this key is depressed, CPU 108 controls writing unit 106 for newly creating transmission control file 104 in memory 101; and End key 208: This key instructs a completion of a series of key operations.

The operation panel shown in FIG. 2 is included in display unit 111.

Figure 3:
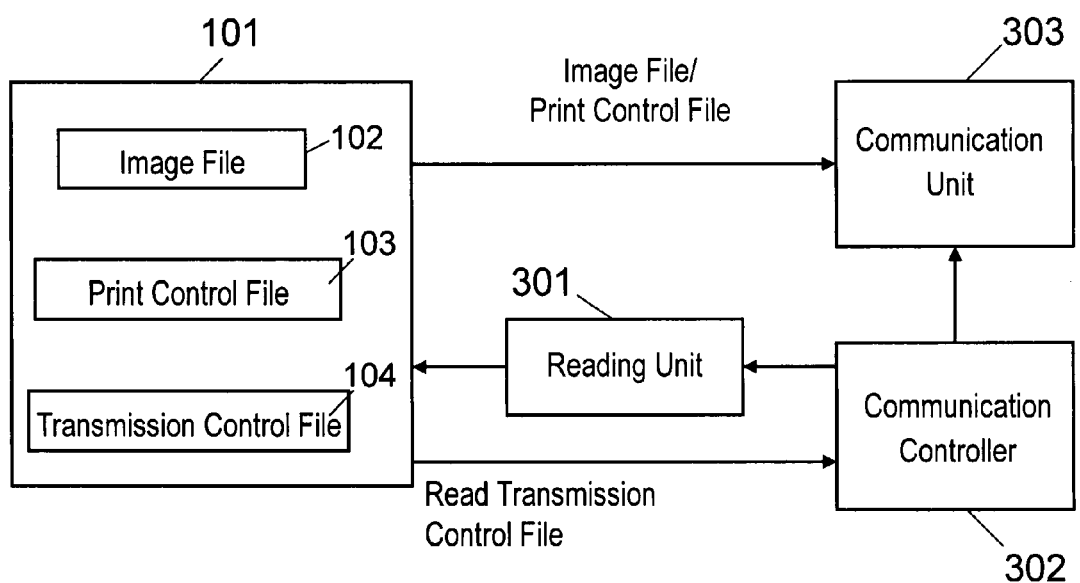
FIG. 3 is a block diagram of a transmitter for transmitting files according to the transmission control file of the print-image specifying/transmitting system in accordance with embodiment 1.

FIG. 3 is a block diagram of a transmitter for transmitting files according to the transmission control file of the print-image specifying/transmitting system in accordance with embodiment 1. In FIG. 3, reading unit 301 reads image file 102, print control file 103, and transmission control file 104 from memory 101. According to a description in file 104, communication controller 302 controls read-out of a file to be transmitted from memory 101 and transmission of the read file through communication unit 303. Communication unit 303 transmits the file read out from memory 101.

A printer for printing a file according to print control file 103 reads an image file of which name is listed in file 103 from memory 101, then prints it. This operation is detailed in the prior art (11-88808), the description thereof is omitted here.

An operation of the apparatus in accordance with embodiment 1 will be described hereinafter. A user selects a desirable file from image file 102 stored in memory 101, then registers it in print control file 103. In this case, file 103 is created according to the following procedure.

Among the files, "A.JPG", "B.JPG", and "C.JPG", stored in memory 101, the user selects "A.JPG" and "B.JPG" to be printed. The following description refers to this case for instance.

First, the user depresses new print control file creating key 206 to start editing a new print control file. This status is called a new print control file creating mode. CPU 108 controls writing unit 106 for creating a print control file named, e.g., "PRINT1" in memory 101.

Figure 4:
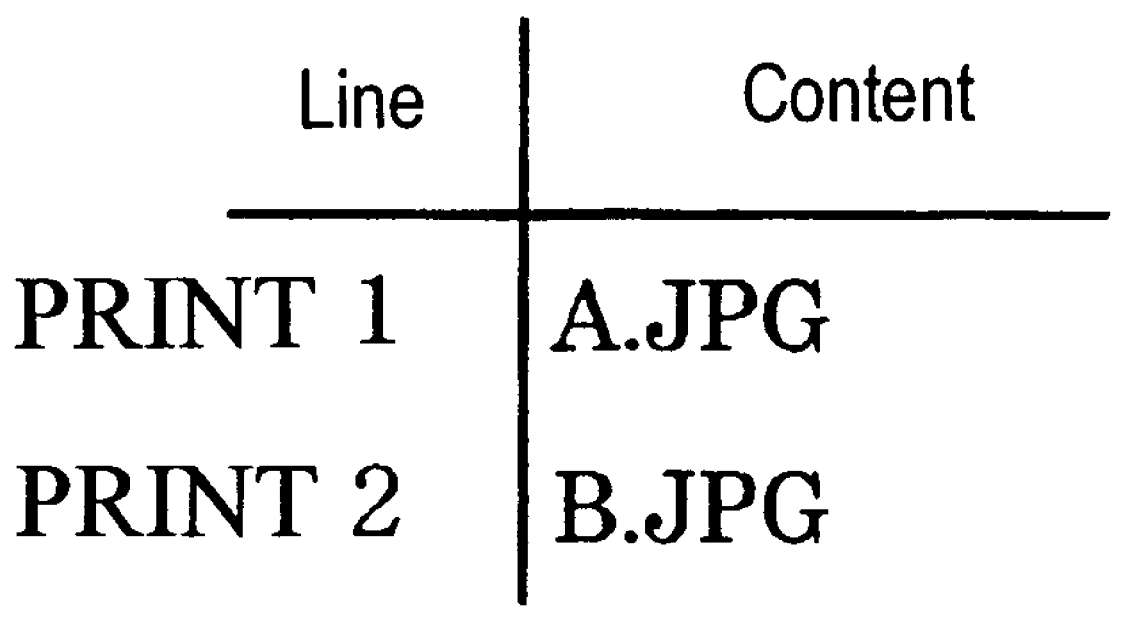

Next, the user depresses file reproduction mode selecting key 201 for reproducing the files stored in memory 101 on display unit 111. In this case, reading unit 105 searches all the files in memory 101, then reads them from memory 101. Image files are decoded with decoder 107 in the order of being read-out, and the images are reproduced on display unit 111. Names of files other than the image files are displayed on display unit 111. The images and the names of files displayed on display unit 111 can be sequentially scrolled by operating feeding key 203 and reverting key 204. When the user selects the files, "A.JPG" and "B.JPG", to be printed, both the files are reproduced through operating feeding key 203 and reverting key 204 and through depressing enter key 205 at each time the file is selected. CPU 108 includes a cache memory for storing information temporarily. The file names of "A.JPG" and "B.JPG" are stored in the cache memory by depressing enter key 205. After selecting an image file to be printed and depressing key 208, the file names stored in the cache memory is stored into print control file 103. FIG. 4 shows a content of print control file 103 including a file named as "PRINT 1".

The print control file named as "PRINT 1" is transmitted to a destination device, then images are printed with the device according to the file. This operation will be described hereinafter.

The user creates a transmission control file according to the following procedure.

First, the user depresses new transmission control file creating key 207 to start editing a new transmission control file. This status is called a new transmission control file creating mode. CPU 108 controls writing unit 106 for creating a file named as "AUTSEND1" in memory 101.

Next, the user depresses file reproduction mode selecting key 201 to reproduce files stored in memory 101 on display means 111.

Then, for transmitting the file (PRINT1), the user operates feeding key 203 and reverting key 204 to display the name of "PRINT 1" on display unit 111 similarly to the print control file. Then, the user depresses enter key 205. CPU 108 includes the cache memory for storing information temporarily. Upon enter key 205 being depressed, the character-string of "SEND#SRC=" for identifying a selected file to be transmitted and the file name of "PRINT1" following the character-string are stored in the cache memory.

Figure 5:
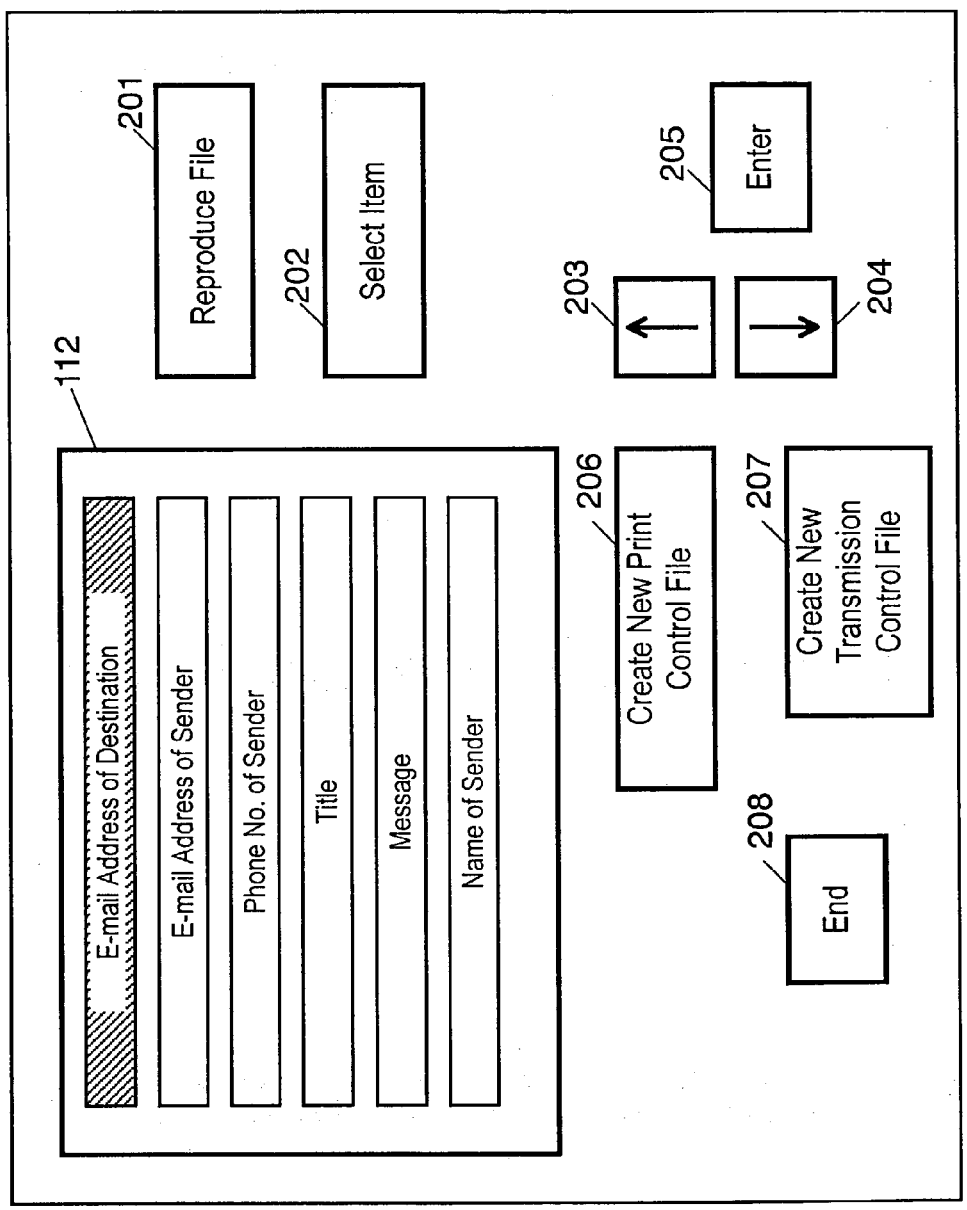
FIG. 5 shows a menu displayed on the apparatus in accordance with embodiment 1, which creates a print control file that specifies an image to be printed and a transmission control file that controls a file transmission.
Figure 6:
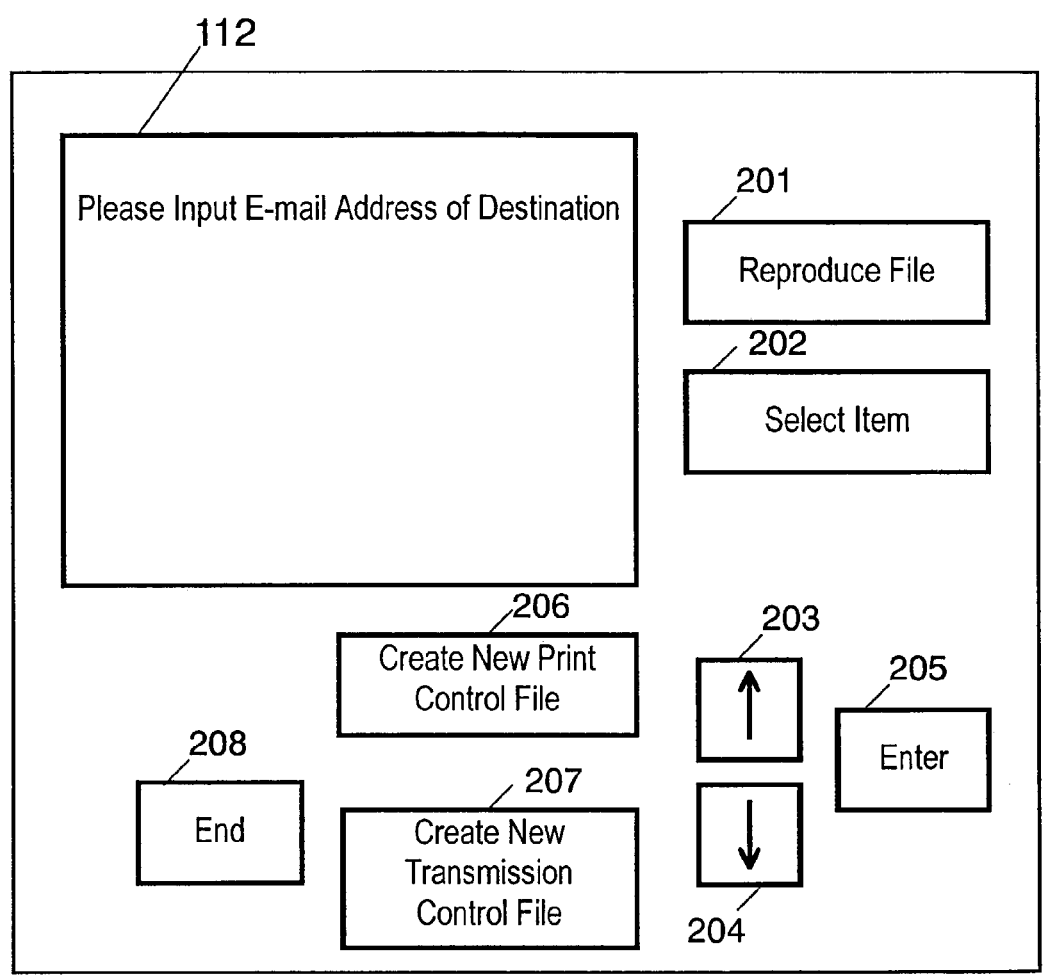
FIG. 6 shows another menu displayed on the apparatus in accordance with embodiment 1, which creates a print control file that specifies an image to be printed and a transmission control file that controls a file transmission.

Next, the user depresses specified item selecting key 202 for inputting information necessary for transmitting files such as a destination of the transmission. Then, as shown in FIG. 5, a menu listing six items is displayed on display unit 111. The six items include "E-mail Address of Destination", "E-mail Address of Sender", "Phone No. of Sender", "Title", "Message" and "Name of Sender". The menu is provided for inputting information necessary for transmission, in which items on a screen can be selected with feeding key 203 and reverting key 204. In FIG. 5, selected items are displayed in reverse pattern, that is, FIG. 5 shows that "E-mail Address of Destination" is selected.

As discussed above, when the user selects an item with feeding key 203 and reverting key 204, as shown in FIG. 5, a character string of the selected item is displayed in reverse pattern, and enter key 205 is then depressed. Then, display unit 111 displays a screen requesting the user to input an e-mail address of the destination. The user inputs the e-mail address of the destination through keyboard 110, which is then displayed on display unit 111. If the address is input correctly, enter key 205 is depressed to complete inputting the e-mail address. Then, the menu shown in FIG. 5 is displayed again. At this time, upon enter key 205 being depressed, CPU 108 instructs the cache memory to store the e-mail address just input following the character string of "SEND#ADR=" indicating an address of the destination.

The other items such as "E-mail Address of Sender", "Phone No. of Sender", "Title", "Message" and "Name of Sender" are input similarly. That is, an item is selected, and necessary information is input through keyboard 110. At this time, the information just input is stored in the cache memory of CPU 108 together with a character string indicating a type of the information. The character strings indicating the types of the information are, for instance, "USR#ADR" indicating an e-mail address of a sender, "USR#TEL" indicating a telephone number of a sender, "SEND#TTL" indicating a title, "SEND#MSG" indicating a message, and "USR#NAM" indicating a name of a sender.

If not needing an item among the six items discussed above, the user need not to input the item. For instance, a message, upon being not attached to a transmission, is not needed to input. In embodiment 1, all the items discussed above are input, and as a result, the cache memory of CPU 108 stores the following content:

SEND#SRC="PRINT1";
SEND#ADR="AAA@BBB.ne.jp";
USR#ADR="CCC@DDD.com";
USR#TEL"8166YYYYYYY";
SEND#TTL="Hello";
SEND#MEG="Good Morning!"; and
USR#NAM="TARO NIPPON".

The character-strings surrounded with a double quotation mark express character codes such as ASCII code.

While items necessary for transmission are input as discussed above, the user presses completing key 208. Then, CPU 108 controls writing unit 106 for writing the content stored in the cache memory of CPU 108 in the order of being stored into transmission control file "AUTSEND1" in memory 101.

If the transmission control file (AUTSEND1) stored in memory 101 includes a name of the print control file (PRINT1) indicated by the character string of "SEND#SRC", CPU 108 reads the print control file from memory 101 via reading unit 105 for obtaining its content. CPU 108 attaches the character string of "SEND#SRC" at a top of an image file to be printed listed in the print control file (PRINT1) in order to added the image file to the transmission control file (AUTSEND1).

Figure 7:
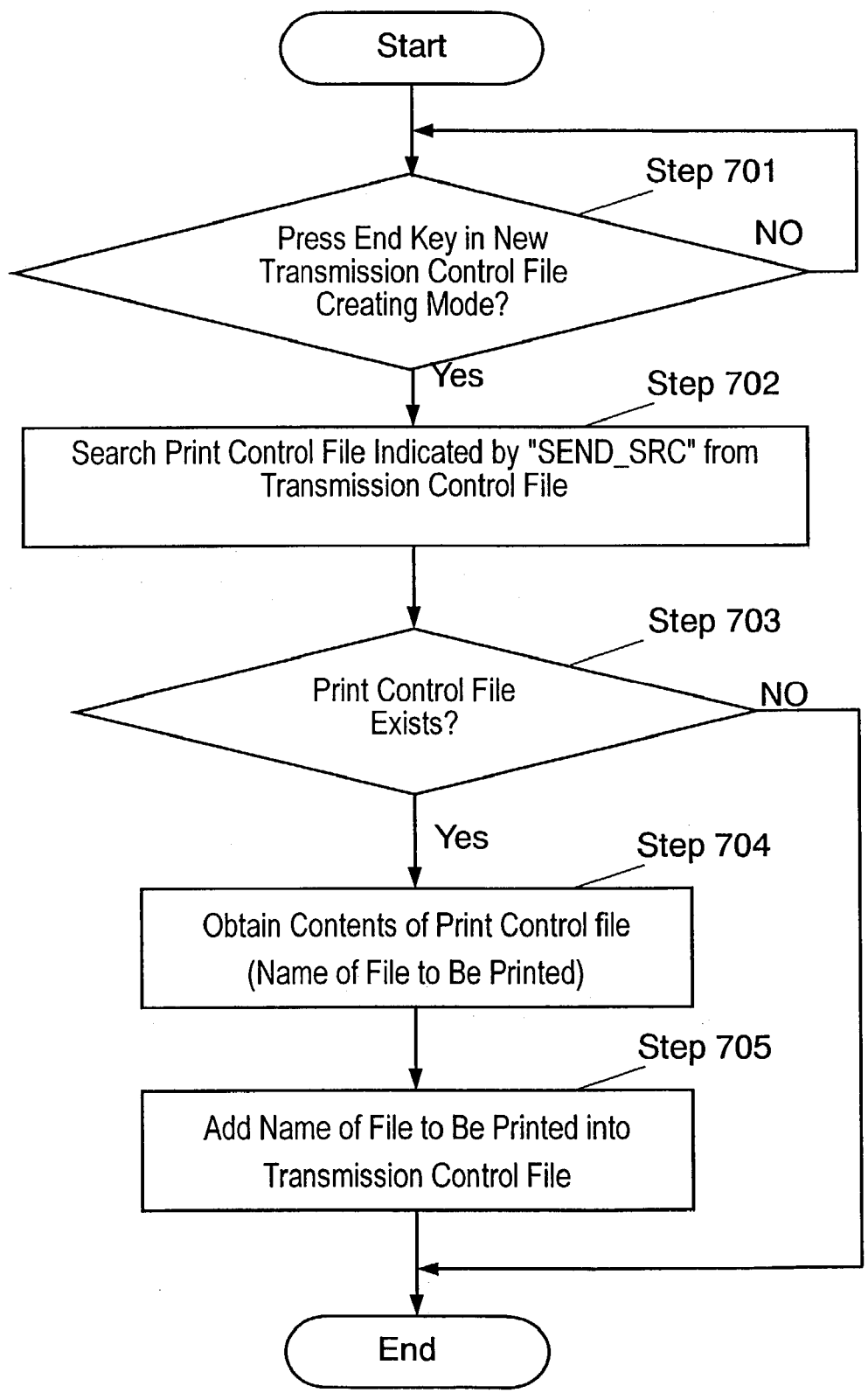
FIG. 7 is a flowchart illustrating a process of adding a name of a file to be printed into transmission control file 104 in accordance with embodiment 1.

FIG. 7 is a flowchart illustrating a procedure of obtaining a content of print control file (PRINT1) and adding its file name to transmission control file (AUTSEND1). In the new transmission control file creating mode, if end key 208 is pressed (Step 701), CPU 108 writes contents of the cache memory into the transmission control file, and searches the print control file indicated by the character string of "SEND#SRC" (Step 702). In this case, if it is determined in advance that the file name of the print control file is specified by, for instance, a character string including "PRINT" and one digit number, the print control file can be searched easily. As a result of the searching, CPU 108 judges whether the print control file exists or not (Step 703). If the file exists, CPU 108 obtains a content of the file, namely, a file name of an image to be printed (Step 704). The file name obtained is added to the transmission control file (Step 705).

FIG. 8 shows a content of the transmission control file (AUTSEND1) created in memory 101. In FIG. 8, indicated by the character string of "SEND#SRC" and others are information such as a name of a file to be transmitted and other items necessary for transmission. As such, the transmission control file contains all information necessary for transmission. Contents on the eighth and ninth lines are added according to a description of the print control file. This enables CPU 108 to recognize that the image files of "A.JPG" and "B.JPG" to be printed are registered in order to transmit the files.

The above procedure shows how to create transmission control file 104.

Transmission of files according to transmission control file 104 shown in FIG. 8 will be described hereinafter. The user connects memory 101 storing file 104 and other files to a transmitter transmitting files according to the transmission control file shown in FIG. 3. Then, reading unit 301 reads the transmission control file to be sent to communication controller 302.

The transmission control file (AUTSEND1) includes names of files to be transmitted and information necessary for transmission such as an e-mail address of a destination together with specific character strings listed therein. Communication controller 302 recognize a content of a transmission control file according to the specific character strings, and controls communication unit 303 for transmitting files. Specifically, the transmission control file shown in FIG. 8 lists all the items such as a name of a file to be transmitted, an e-mail address of a destination, an e-mail address of a sender, a telephone number of the sender, a title, a message, and a name of the sender. The print control file, and the file "A.JPG" as well as the file "B.JPG" read out with reading unit 301 from memory 101 are transmitted to the e-mail address of the destination as attached files to the e-mail. The items, "E-mail Address of Sender", "Phone No. of Sender", "Title", "Message" and "Name of Sender" listed in the transmission control file (AUTSEND1) are also described in the e-mail. Specifically, a title of the e-mail to be transmitted is indicated by the character string of "SEND#TTL", and character strings specified by "SEND#MSG" are described as the message of the e-mail. Information about the sender is also described in the e-mail. The e-mail thus prepared is transmitted with communication unit 303.

Figure 9:
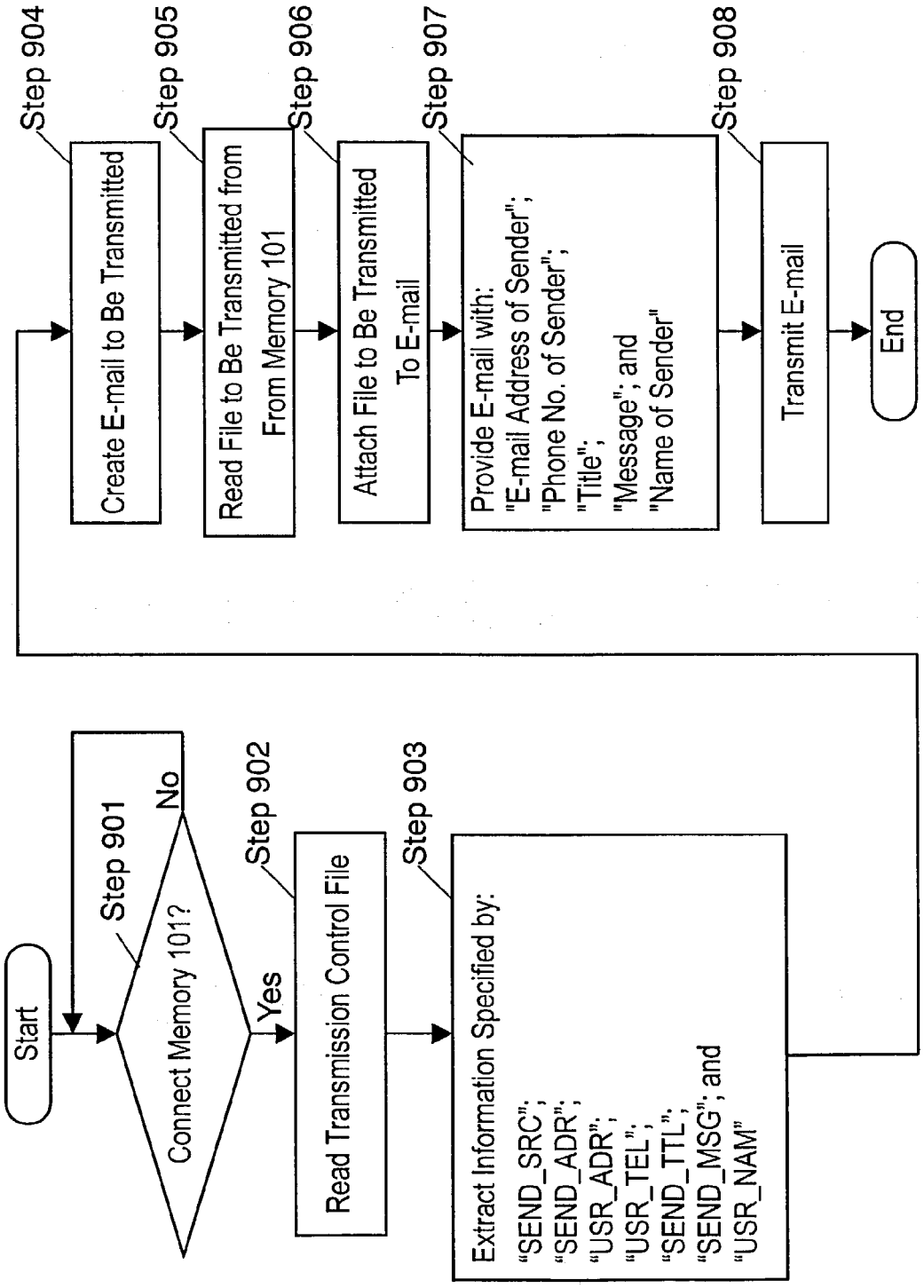
FIG. 9 is a flowchart illustrating a transmitting operation in accordance with embodiment 1.

FIG. 9 is a flowchart illustrating a procedure of the transmission of files discussed above. It is detected whether memory 101 is connected to the apparatus or not (Step 901). If memory 101 is connected, reading unit 301 reads the transmission control file in memory 101 and send it to communication controller 302 (Step 902). Information in the file is extracted and obtained (Step 903). Communication controller 302 creates an e-mail in communication unit 303, and sets a destination specified by "SEND#ADR" in the transmission control file (Step 904). Reading unit 301 reads files to be transmitted, i.e., the print control file (PRINT1), image files of "A.JPG" and "B.JPG" (Step 905). The files are attached to the e-mail (Step 906). The e-mail is provided with information following "E-mail Address of Sender", "Phone No. of Sender", "Title", "Message" and "Name of Sender" obtained from the transmission control file (Step 907). Finally, communication unit 303 is instructed to transmit the e-mail having the print control file (PRINT1) and image files of "A.JPG" and "B. JPG" (Step 908).

The transmitted e-mail, which has the print control file and the image files to be printed as discussed above, and a receiver can print the image files attached to the e-mail according to the print control file.

As discussed above, according to embodiment 1, a user, upon asking a remote third party to print image files according to a print control file, only creates the print control file and specifies the file as a file to be transmitted. Then the image files to be printed are listed in a transmission control file as the files to be transmitted. Therefore, just specifying the print control file as a file to be transmitted, the user can transmit the print control file together with the image files to be printed with the transmission control file. In other words, the user needs not to select or instruct image files to be printed and image files to be transmitted separately. Embodiment 1 advantageously increases convenience for users.

Exemplary Embodiment 2

In embodiment 1, in the case that a print control file is specified as a file to be transmitted, CPU 108 obtains a content of the file and adds image files to be printed into a transmission control file. The print control is thus transmitted together with the image files to be printed.

In exemplary embodiment 2, in the case that a print control file is specified as a file to be transmitted, communication controller obtains a content of the file and transmits image files to be printed together with the print control file.

The case that a print control file (PRINT1) in accordance with embodiment 1 is transmitted will be described hereinafter. The file "PRINT1" is created similarly to embodiment 1, and the description thereof is thus omitted here. An operation panel of an apparatus of a print image specifying/transmitting system is similar to FIG. 2, and the description thereof is thus omitted here. The apparatus creates a transmission control file for controlling file transmission and a print control file for specifying image files to be printed.

Figure 10:
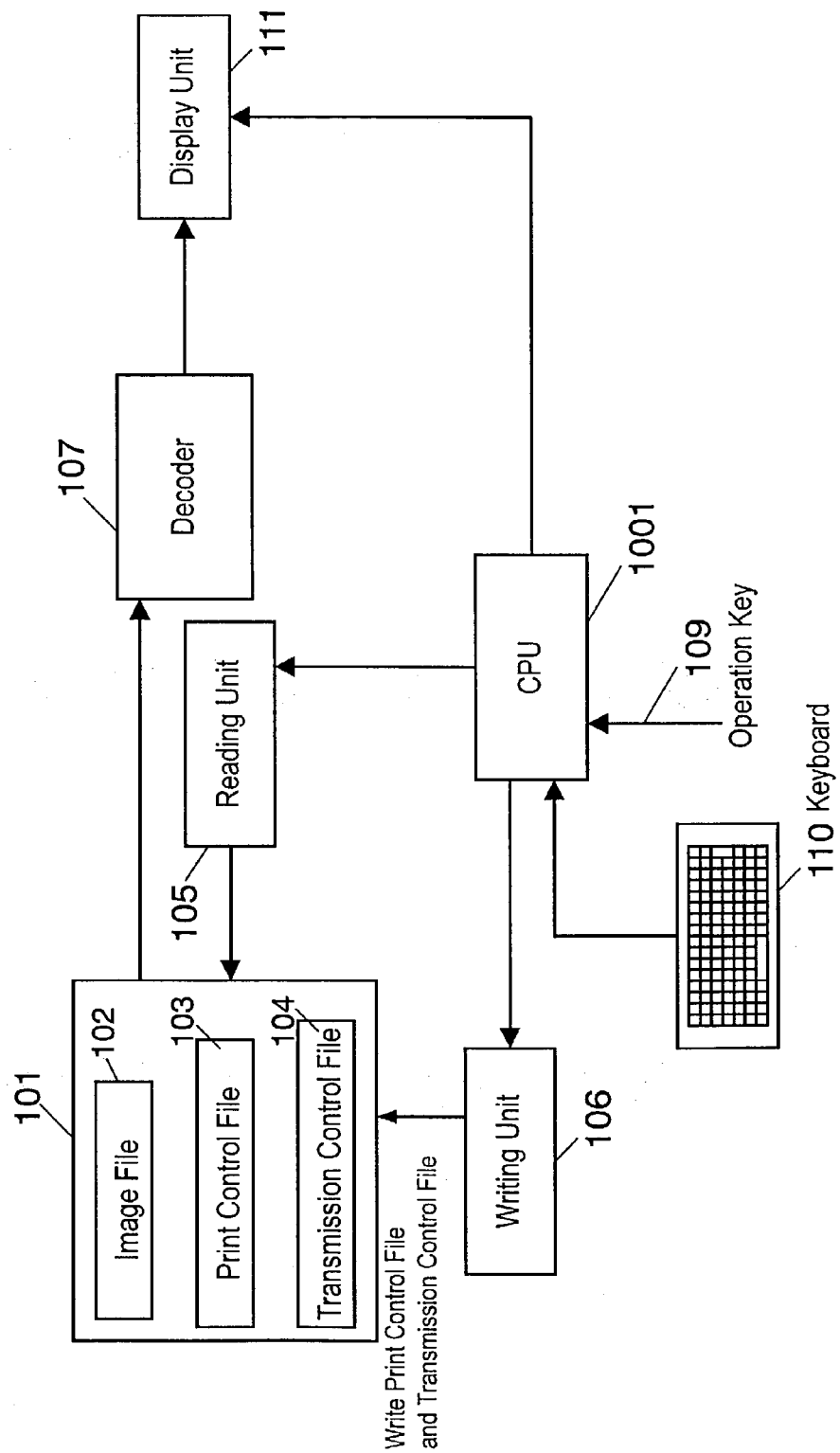
FIG. 10 is a block diagram of an apparatus of a print-image specifying/transmitting system in accordance with exemplary embodiment 2 of the present invention. This apparatus creates a print control file for specifying an image to be printed and a transmission control file for controlling a file transmission.

FIG. 10 is a block diagram of an apparatus of a print-image specifying/transmitting system in accordance with embodiment 2 of the present invention. This apparatus creates a print control file for specifying an image to be printed and a transmission control file for controlling file transmission. CPU 1001 creates and edits the print control file 103 and transmission control file 104 responsive to inputs through operating keys 109 or keyboard 110, and controls reading unit 105 to read image files and display unit 111 displaying a menu. Differences from CPU 108 of embodiment 1 will be described later.

Figure 11:
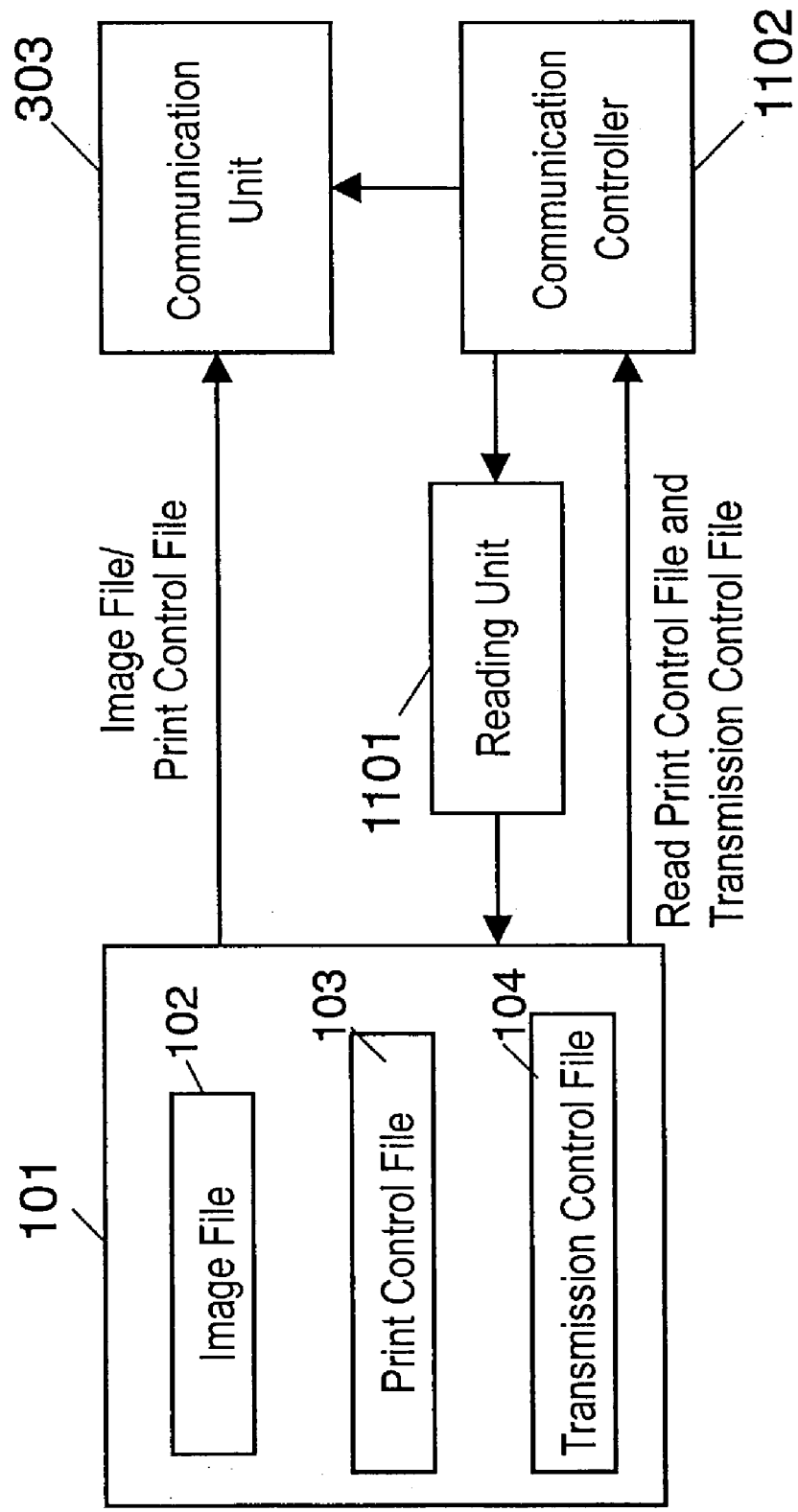
FIG. 11 is a block diagram of a transmitter for transmitting files according to the transmission control file of the print-image specifying/transmitting system in accordance with embodiment 2.

FIG. 11 is a block diagram of a transmitter for transmitting files according to the transmission control file of the print-image specifying/transmitting system in accordance with embodiment 2. In FIG. 11, the apparatus includes memory 101, image file 102, print control file 103, and transmission control file 104, similarly to FIG. 1. The apparatus further includes communication unit 303 similar to FIG. 3. Reading unit 1101 reads image file 102, print control file 103 and transmission control file 104 from memory 101. Communication controller 1102 controls the read-out of a file to be transmitted from memory 101 and the transmission of the read out file through communication unit 303 according to a description in file 103 and file 104.

A procedure of specifying the print control file (PRINT1) as a file to be transmitted, and setting information such as "E-mail Address of Destination", "E-mail Address of Sender" and the like is similar to embodiment 1. First, new transmission control file creating key 207 is depressed. Subsequent operation, since being the same as that in embodiment 1, is not described here. However, an operation after the setting of the information such as "E-mail Address of Destination", "E-mail Address of Sender" and the like differs from that of embodiment 1. The difference will be described hereinafter. A transmission control file created in embodiment 2 is named as "AUTSEND2".

After the information such as "Name of File to Be Transmitted", "Email Address of Destination", "E-mail Address of Sender", "Phone No. of Sender", "Title", "Message", and "Name of Sender" is input, similarly to embodiment 1, a cache memory of CPU 1001 stores the following contents SEND#SRC="PRINT1";
SEND#ADR="AAA@BBB.ne.jp";
USR#ADR="CCC@DDD.com";
USR#TEL="8166YYYYYYY";
SEND#TTL="Hello";
SEND#MEG="Good Morning!"; and
USR#NAM="TARO NIPPON".

Items necessary for transmission are input as discussed above, and the user then presses end key 208. CPU 1001 controls writing unit 106 for writing the contents stored in the cache memory of CPU 108 in the order of being stored into transmission control file "AUTSEND2" stored in memory 101. At this time, in embodiment 1, a content of the print control file is obtained, and the character string of "SEND#SRC" is attached at a top of a name of an image file, and the image file is thus added to the transmission control file. However, in embodiment 2, the content stored only in the cache memory is written into file "AUTSEND2".

FIG. 12 shows the content of the transmission control file (AUTSEND2) created in memory 101. Transmission control file 104 is thus created.

Transmission of files according to transmission control file 104 shown in FIG. 12 will be demonstrated hereinafter. The user connects memory 101 storing file 104 and other files to a transmitter transmitting files according to the transmission control file shown in FIG. 11. Then, reading unit 1101 reads the transmission control file to be sent to communication controller 1102.

The transmission control file includes names of files to be transmitted and information necessary for transmission such as an e-mail address of a destination together with a specific character string. Communication controller 1102 determines which file is the print control file to be transmitted according to the listed content, and then obtains the content of the file. The print control file includes the names of image files to be printed. Communication controller 1102 searches memory 101 for the image files to be printed via reading unit 1101 based on the file names, and adds the image files as file to be transmitted with communication unit 303. Specifically, the transmission control file shown in FIG. 12 includes items such as a name of a file to be transmitted, an e-mail address of a destination, an e-mail address of a sender, a telephone number of the sender, a title, a message, and a name of the sender. Communication controller 1102 controls reading unit 1101 to reads the print control file to be transmitted from memory 101. Then, according to a content of the file, reading unit 1101 reads a file "A.JPG" as well as a file "B.JPG" which are the files to be printed. The files are transmitted to the e-mail address of the destination as attached files of the e-mail. The items, "E-mail Address of Sender", "Phone No. of Sender", "Title", "Message" and "Name of Sender" listed in the transmission control file 104 are also included in the e-mail. More specifically, a title of the e-mail to be transmitted is indicated by a character strings following "SEND#TTL", and the message of the e-mail is indicated by character strings following "SEND#MSG". Information about the sender is also described in the e-mail. The e-mail thus prepared is transmitted with communication unit 303.

Figure 13:
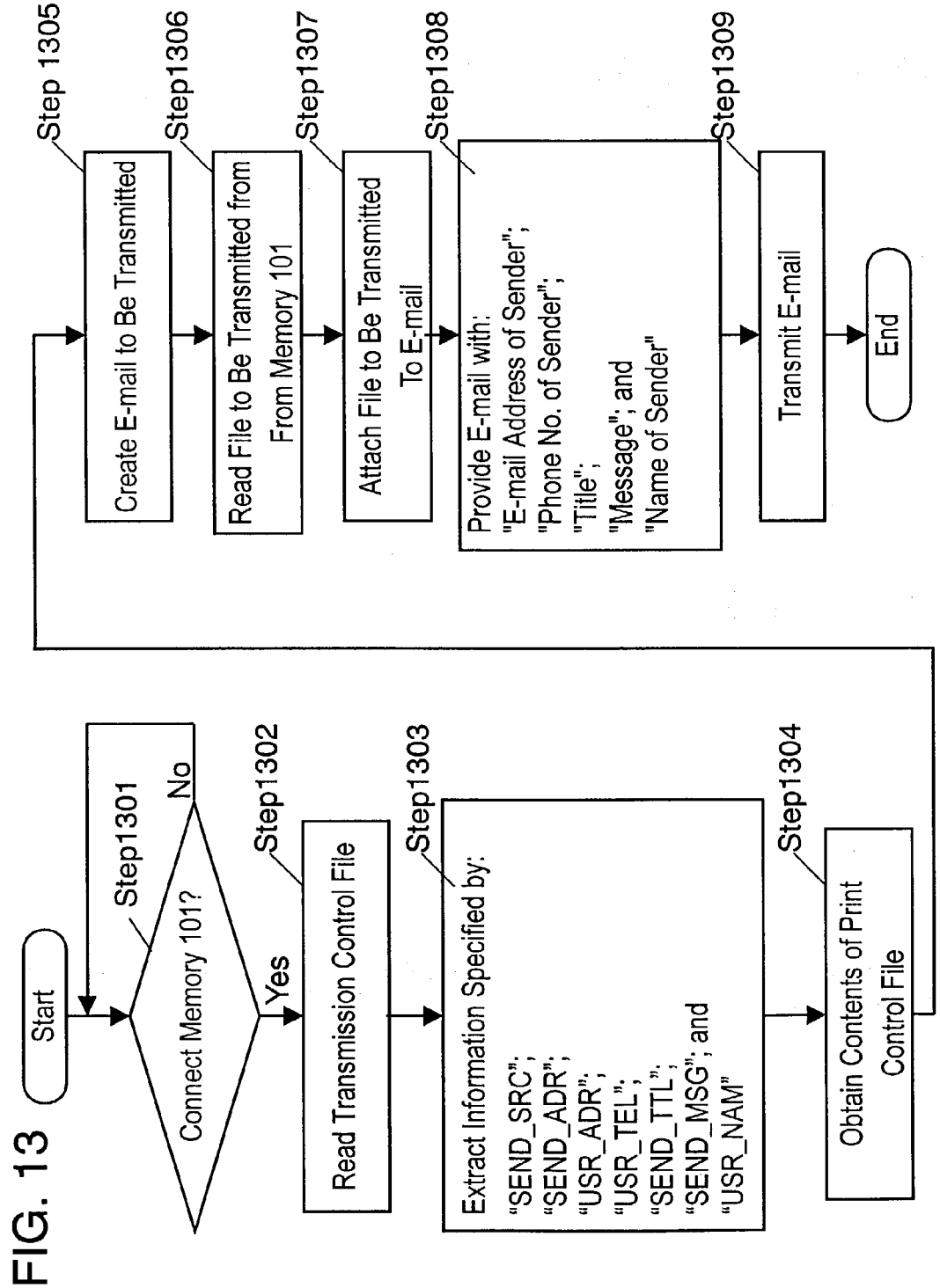
FIG. 13 is a flowchart illustrating a transmitting operation in accordance with embodiment 2.

FIG. 13 is a flowchart illustrating a procedure of the transmission of files discussed above. It is detected whether memory 101 is connected to the apparatus or not (Step 1301). If memoir 101 is connected, reading unit 1101 reads the transmission control file stored in memory 101 and sends it to communication controller 1102 (Step 1302). Communication controller 1102 extracts and obtains information in the transmission control file (Step 1303) to obtain names of the image files to be printed (Step 1304). Communication controller 1102 creates an e-mail in communication unit 303, and sets a destination to that specified by "SEND#ADR" in the transmission control file (step 1305). Reading unit 1101 reads the print control file (PRINT1), image files named as "A.JPG" and "B.JPG" (Step 1306). Communication controller 1102 attaches the file "PRINT1", image files "A.JPG" and "B.JPG" to the e-mail created in communication unit 303 (Step 1307). Communication controller 1102 describes an e-mail address of a sender, a telephone number of the sender, a title, a message and a name of the sender obtained from the transmission control file (Step 1308). Communication controller 1102 instructs communication unit 303 to transmit the e-mail having the print control file (PRINT1) and image files (A.JPG and B.JPG) attached thereto (Step 1309).

The e-mail transmitted includes names of the print control file and the image files to be printed as discussed above, and a receiver can print the image files attached to the e-mail with the print control file.

As discussed above, according to embodiment 2, a user, upon asking a remote third party to print image files according to a print control file, creates the print control file and transmits the file. Then, image files to be printed are specified based on a content of the print control file transmitted, and the specified files are transmitted to a destination. The user, therefore, simply specifies the print control file as a file to be transmitted, and this allowing the print control file to be transmitted together with the image files to be printed. In other words, the user needs not to specify image files to be printed and image files to be transmitted separately. Thus, embodiment 2 advantageously increases convenience for users.

Exemplary Embodiment 3

Embodiment 1 describes an apparatus for transmitting a desirable print control file to a destination by creating a transmission control file. Exemplary embodiment 3 describes an apparatus for transmitting a desirable print control file to plural destinations with a transmission control file.

A print control file having a name of "PRINT2" specifying an image file named "A.JPG" to be printed is sent to a destination. Another print control file having a name of "PRINT3" specifying an image file named "B.JPG" to be printed is sent to another destination. The print control files are created similarly to embodiment 1, and the description thereof is thus omitted here.

A block diagram of an apparatus of a print image specifying/transmitting system in accordance with embodiment 3 of the present invention is the same as that shown in FIG. 1. The apparatus creates a print control file for specifying an image to be printed and a transmission control file for controlling transmission of files. Further, a block diagram of a transmitter for transmitting files according to the transmission control file of a print-image specifying/transmitting system in accordance with embodiment 3 is the same as that shown in FIG. 3 illustrating embodiment 1. The apparatus in accordance with embodiment 3 is described thus with reference to FIG. 1 and FIG. 3.

Figure 14:
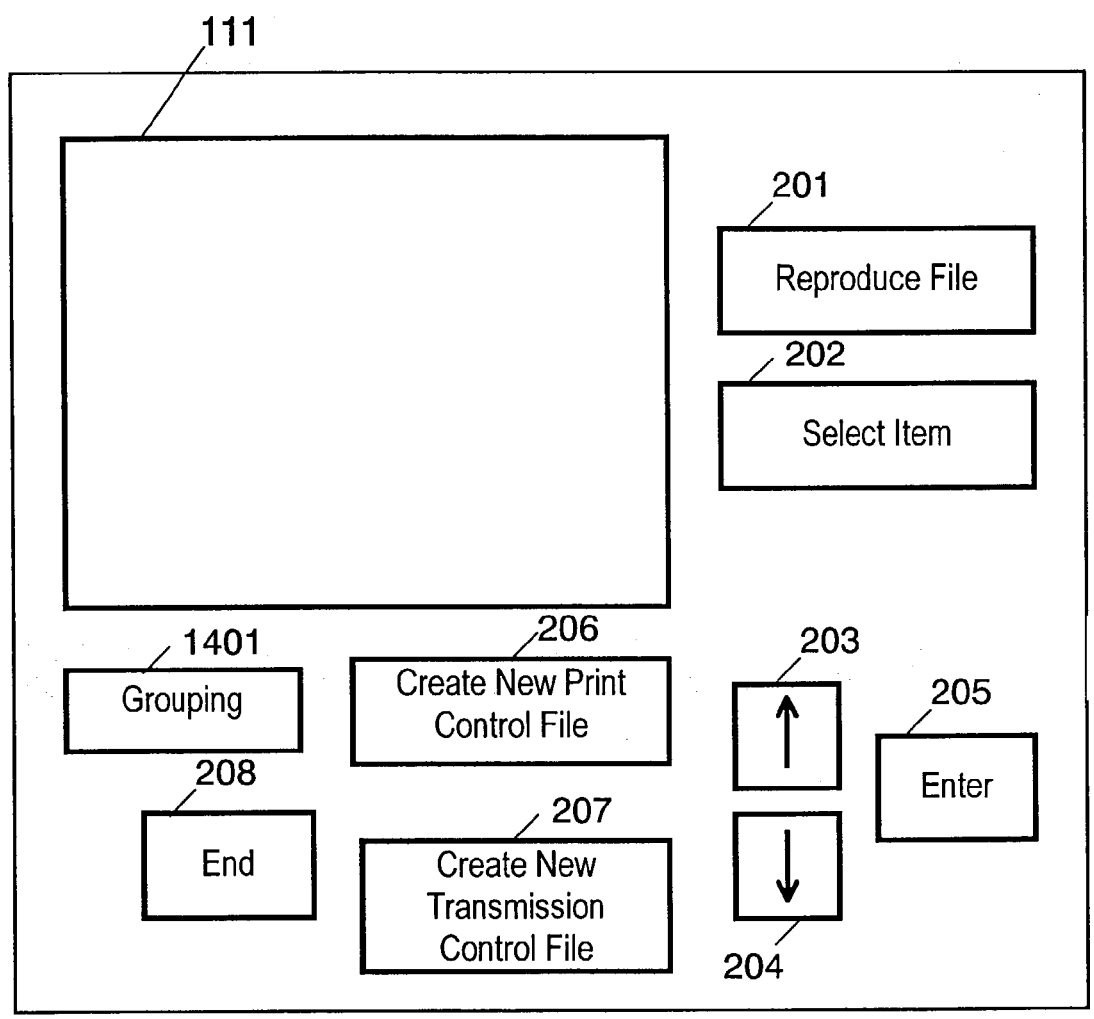
FIG. 14 shows an operation panel of an apparatus in accordance with exemplary embodiment 3 of the present invention, which creates a print control file for specifying an image to be printed, and a transmission control file for controlling a file transmission.

FIG. 14 shows an operation panel of the apparatus in accordance with embodiment 3 of the present invention, which creates the print control file for specifying an image to be printed and a transmission control file for controlling transmission of files.

Operating keys 201 to 208 are the same as those shown in FIG. 2 illustrating embodiment 1, and the descriptions thereof are omitted. If grouping key 1401 is depressed, a specific group ID is provided to information written in the transmission control file.

An operation of the apparatus in accordance with embodiment 3 will be described hereinafter.

A first print control file "PRINT2" is specified as a file to be transmitted. A procedure of setting information such as an e-mail address of a destination, an e-mail address of a sender and the like is the same as that in embodiment 1, i.e., the procedure starts with depressing new transmission control file creating key 207. Since subsequent operations are the same as those in embodiment 1, the description thereof is thus omitted here. However, an operation after setting the information such as an e-mail address of a destination, an e-mail address of a sender and the like differs from those of embodiment 1. The difference is will be described hereinafter. A transmission control file created according to embodiment 3 is named as "AUTSEND3".

Similarly to embodiment 1, after the information such as a name of a file to be transmitted, an e-mail address of a destination, an e-mail address of a sender, a telephone number of the sender, a title, a message, and a name of the sender is input, a cache memory of CPU 108 stores the following items:

SEND#SRC="PRINT2";
SEND#ADR="AAA@BBB.ne.jp";
USR#ADR="CCC@DDD.com";
USR#TEL="8166YYYYYYY";
SEND#TTL="Hello";
SEND#MEG="Good Morning!"; and
USR#NAM="TARO NIPPON".

Items necessary for transmission are thus input, and grouping key 1401 is then depressed. CPU 108 recognizes a specified file name of the print control file and the information about the items necessary for transmission as a group. CPU 108 provides the group with an ID number (e.g. 001). CPU 108 controls writing unit 106 to write the ID number proper to the group and contents of the cache memory in the order of being stored into transmission control file "AUTSEND3" in memory 101.

Next, a user, upon pressing file reproduction mode selecting key 201 similarly to specifying a file "PRINT2", operates feeding key 203 and reverting key 204 to display a file name "PRINT3" of the print control file to be transmitted on display unit 111, and presses enter key 205. Then, CPU 108 stores the file name "PRINT3" following the character string of "SEND#SRC=" into the cache memory in order for the user to clarify that this file is selected in the file reproduction mode as a file to be transmitted.

The user then presses specified item selecting key 202 in order to input information such as a destination necessary for transmission of files, and inputs the following six items, an e-mail address of a destination, an email address of a sender, a telephone number of the sender, a title, a message, and a name of the sender. This is the same procedure as what the user do for a file "PRINT2".

Resultant input is stored in the cache memory of CPU 108 together with specific character strings similarly to embodiment 1. All the items discussed above are input here, and as a result, the cache memory of CPU 108 stores the following content about transmitting print control file "PRINT3":

SEND#SRC="PRINT2";
SEND#ADR="EEE@FFF.ne.jp";
USR#ADR="CCC@DDD.com";
USR#TEL="8166YYYY";
SEND#TTL="Bye";
SEND#MEG="Thank You"; and
USR#NAM="TARO NIPPON".

After necessary items for transmission are thus input, grouping key 1401 is depressed. CPU recognizes a file name of the print control file "PRINT3" specified and the items necessary for transmission as one group. CPU 108 provides the group with an ID number (e.g. 002) proper to the group. Then, CPU 108 controls writing unit 106 to write the ID number proper to the group and the contents stored in the cache memory into memory 101 in addition to the information for transmitting print control file "PRINT2".

Upon end key 208 being depressed subsequently, CPU 108 reads the print control file indicated by the characterstring of "SEND#SRC" from memory 101 via reading unit 105 for obtaining a content thereof if transmission control file "AUTSEND3" in memory 101 includes a name of the file. Further, CPU 108 provides a name of an image file to be printed listed in the print control file with the character string of "SEND#SRC" at a top thereof, and adds the file name to the transmission control file "AUTSEND3". In this case, since print control file "PRINT2" belongs to a first group having proper ID No. "001", the image file name to be printed listed in the file "PRINT2" is added to the first group in the transmission control file. Similarly to this, since the print control file "PRINT3" belongs to a second group having proper ID No. "002", the image file name to be printed listed in the file "PRINT3" is added to the second group in the transmission control file.

Figure 15:
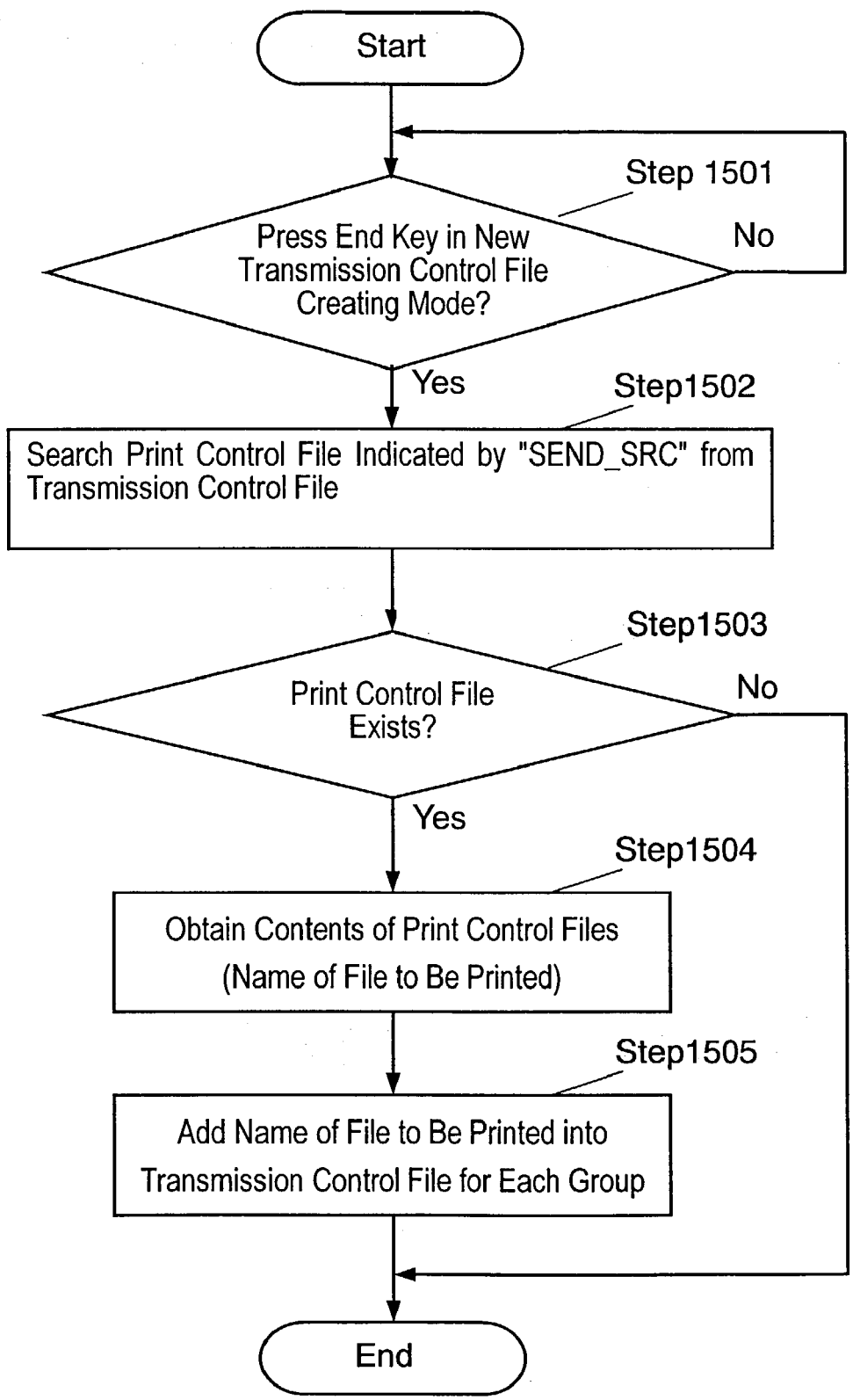
FIG. 15 is a flowchart illustrating a process to add a name of a file to be printed into transmission control file 104 in accordance with embodiment 3.

FIG. 15 is a flowchart illustrating a process to add a name of a file to be printed to transmission control file "AUTSEND3". If end key 208 is depressed in the new transmission control file creating mode (Step 1502), CPU 108 searches the transmission control file in memory 101 for the print control file indicated by the character string of "SEND#SRC (Step 1502). Based on the search, CPU 108 determines whether the print control file exists or not (Step 1503). If the file exists, CPU 108 obtains all the contents of the file (Step 1504). An image file name thus obtained is added to the transmission control file for each group (Step 1505).

FIG. 16 shows contents of transmission control file "AUTSEND3" created in memory 101. The table shown in FIG. 16 includes an item "GID" is an ID number of a group, and includes two groups having ID numbers 001 and 002. In the transmission control file, the information about transmitting file "PRINT2" and the information about transmitting file "PRINT3" are separately described in respective groups having different group ID Nos. As discussed above, CPU 108 adds the descriptions on the 9th line and 18th line according to the description in the print control file to set image files "A.JPG" and "B.JPG" to be printed to files to be transmitted. Transmission control file 104 is thus created.

Next, a file transmission based on transmission control file 104 shown in FIG. 16 will be described hereinafter.

Files are transmitted basically in the same manner as the demonstration in embodiment 1 except that the files is transmitted to two groups listed in the transmission control file. In other words, regarding the transmission of file "PRINT2", based on the information described in the group of ID No. 001, file "PRINT2" to be transmitted and image files "A.JPG" and "B.JPG" to be printed are read from memory 101. This is the same operation as that in embodiment 1. Then, the files are attached to an e-mail to be sent to an e-mail address specified by the character string of "SEND#ADR", namely sent to the address of "AAA@BBB.ne.jp" shown in FIG. 16. At this moment, the information indicated by other character strings is also attached to the e-mail and transmitted.

Before being transmitted, file "PRINT3" to be transmitted and image file "B.JPG" to be printed are read from memory 101 based on the information described in the group of ID No. 002. The files are attached to the e-mail to be sent to the e-mail address specified by the character string of "SEND#ADR", namely, in FIG. 16, the files are attached to the e-mail addressed to "EEE@FFF.ne.jp". At this moment, information specified by other character strings are also described in the e-mail and transmitted. A group in the transmission control file is recognized, for instance, as lines from a smaller line number to just before the next ID number as one bundle of information. The last group includes the last group number and onward until the end of the file.

As discussed above, according to embodiment 3 of the present invention, information belonging to a file to be transmitted is described in a form of plural groups in a transmission control file. Therefore, the desirable file can be transmitted to plural desirable destinations according to the transmission control file. In this case, a user only specifies a print control file as a file to be transmitted, then the print control file and an image file to be printed can be transmitted. This substantially increases convenience for users similarly to embodiment 1.

A number of groups to be listed in the transmission control file is not limited to two; but three or more groups may be included in the transmission control file by repeating the procedure discussed above. This allows the file to be transmitted to three or more destinations.

Exemplary Embodiment 4

In embodiment 2, an image file listed in a print control file to be printed is transmitted together with the print control file according to a description in a transmission control file. In embodiment 3 discussed above, an apparatus for transmitting a desirable file to plural destinations is described.

Embodiment 4 relates to an apparatus having advantages of embodiments 3 and 4. If a print control file is transmitted to plural destinations, an image file to be printed and the print control file are transmitted simultaneously according to embodiment 4. The print control file is created similarly to embodiment 1, thus the description thereof is omitted here.

A block diagram of an apparatus for creating a print control file for specifying a print image and a transmission control file for controlling transmission of files is the same as that shown in FIG. 10 illustrating embodiment 2. Also, a block diagram of a transmitter for transmitting a file according to the transmission control file is the same as that shown in FIG. 11 illustrating embodiment 2. The apparatuses belong to a print-image specifying/transmitting system in accordance with embodiment 4. Therefore, embodiment 4 will be described with reference to FIGS. 10 and 11.

In embodiment 3, contents of the print control file are obtained when the transmission control file is created, and a name of the image file to be printed is listed in the transmission control file. In embodiment 4, a name of an image file to be printed is not listed in a transmission control file. Instead, when communication unit 303 transmits a print control file according to a content of the transmission control file, communication controller 1102 obtains the content of the print control file and reads the image file to be printed from memory 101 via reading unit 1101. Then, communication controller 1102 transmits the image file together with the print control file. FIG. 17 details the transmission control file created according to embodiment 4.

Figure 18:
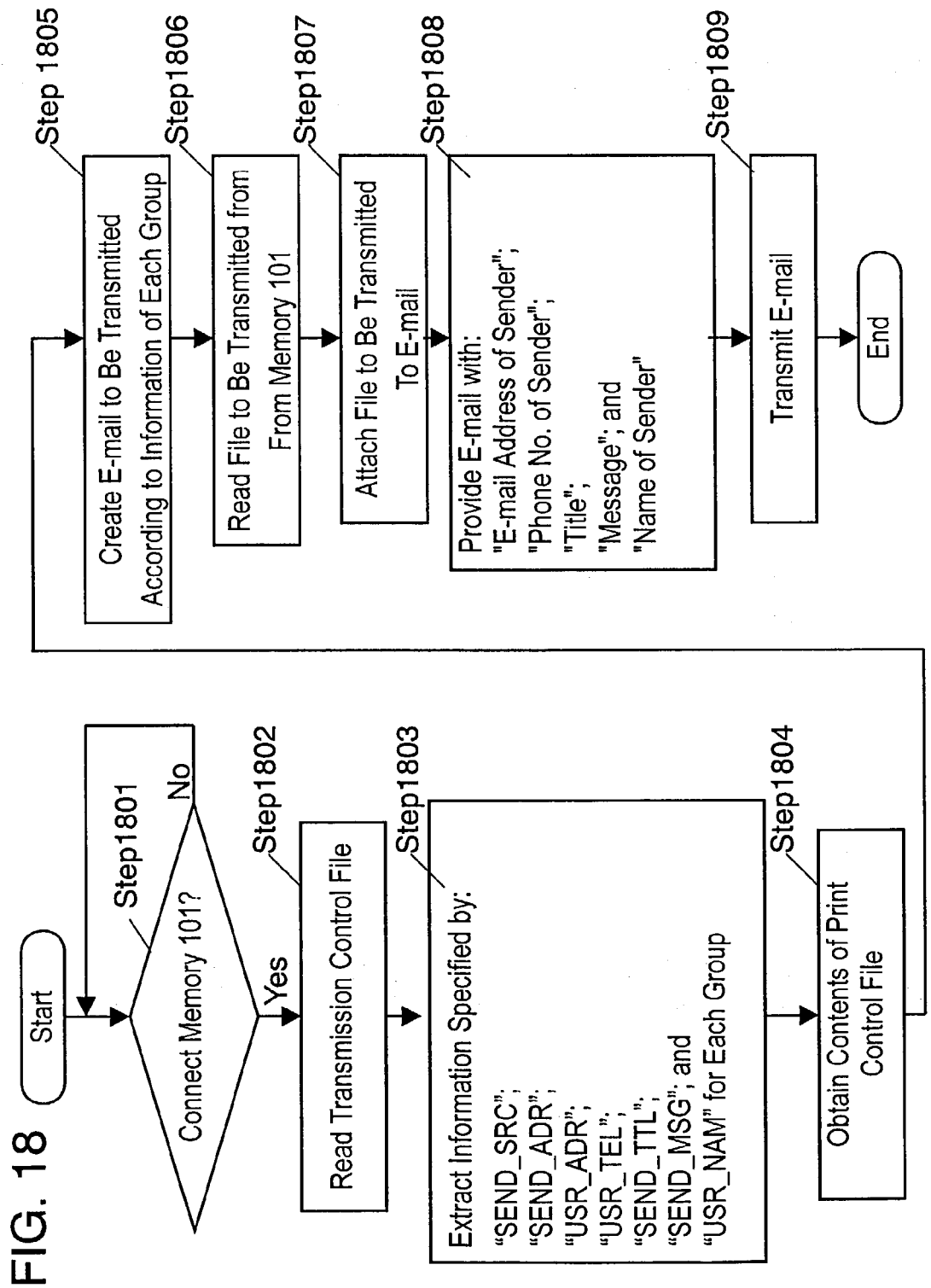
FIG. 18 is a flowchart illustrating a transmitting operation in accordance with embodiment 4.
Figure 19:
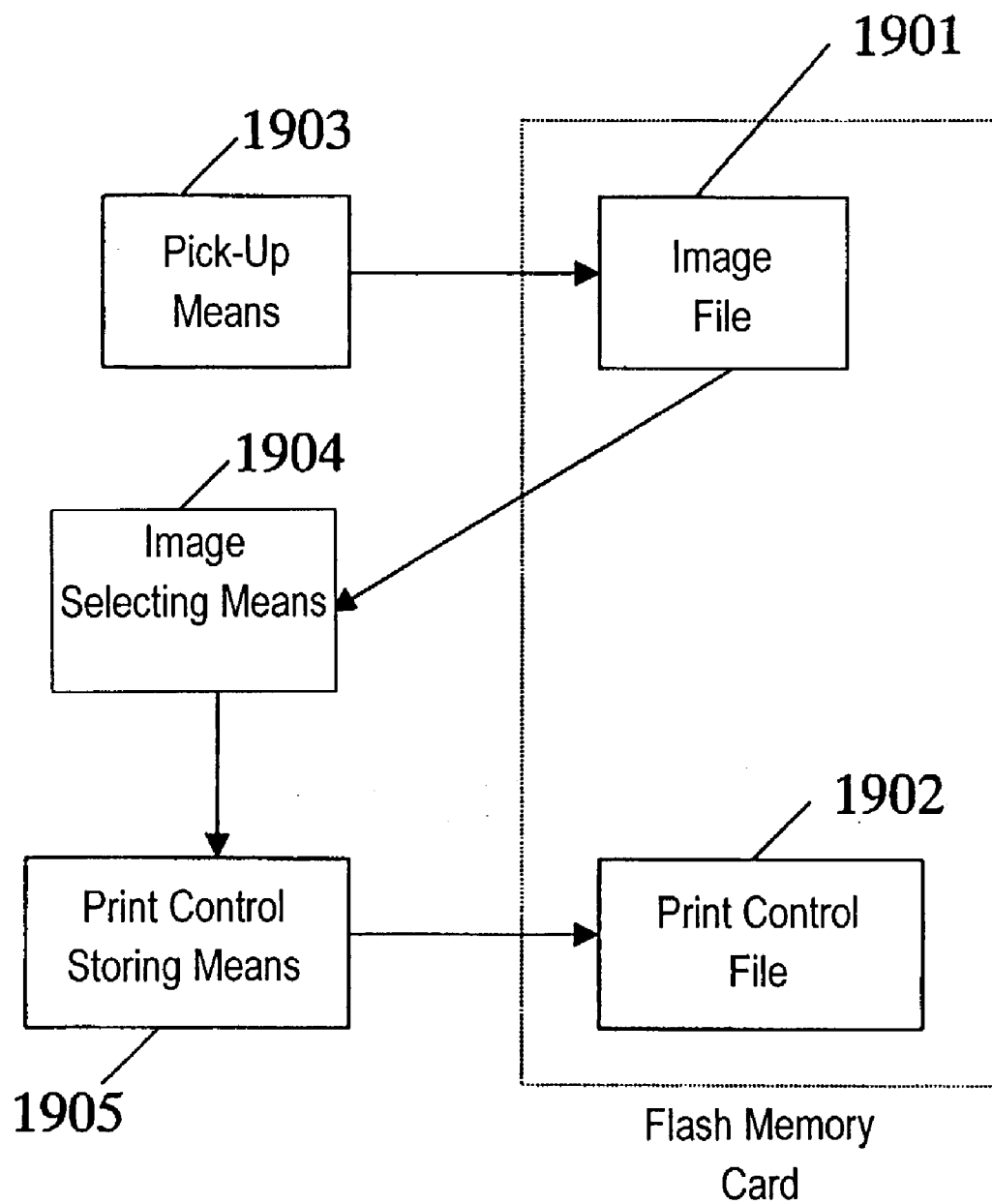
FIG. 19 is a block diagram of a conventional apparatus for creating a print control file.
Figure 20:
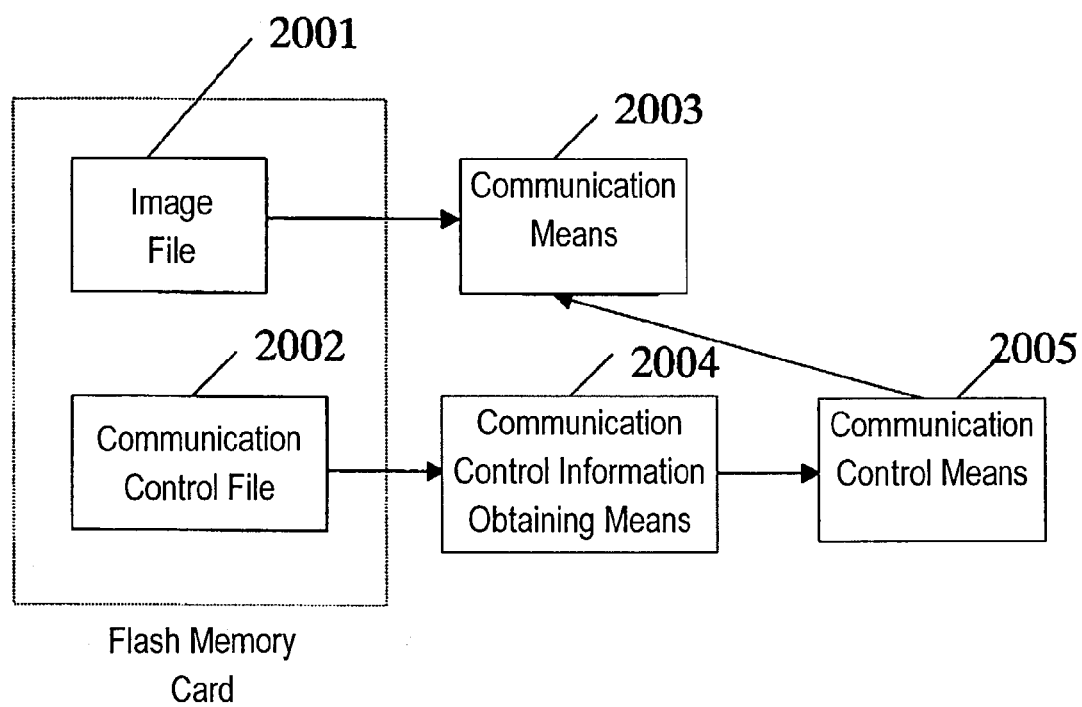
FIG. 20 is a block diagram of a conventional file transmitter.

FIG. 18 is a flowchart illustrating a procedure of transmission of files in accordance with embodiment 4 of the present invention. It is detected whether memory 101 is connected to the apparatus (Step 1801). If memory 101 is connected to the apparatus, reading unit 1101 reads the transmission control file from memory 101 and sends it to communication controller 1102 (Step 1802). Information listed in the transmission control file is extracted and obtained group by group (Step 1803). Communication controller 1102 obtains the content of the print control file listed in the transmission control file for obtaining names of image files to be printed (Step 1804). Communication controller 1102 creates an e-mails in communication unit 303 for each group listed in the transmission control file, and sets respective destinations of the e-mails following a character string of "SEND#ADR" (Step 1805). Communication controller 1102 controls reading unit 1101 to read the print control files (PRINT2 and PRINT3) and image files "A.JPG" and "B.JPG" to be transmitted, from memory 101 (Step 1806). Communication controller 1102 attaches file "PRINT2" and image file "A.JPG" to the e-mail created in communication unit 303, and also attaches file "PRINT3" and image file "B.JPG" to another e-mail (Step 1807). Information obtained from the transmission control file such as an e-mail address of a sender, a telephone number of the sender, a title, a message, and a name of the sender is listed to the respective e-mails (Step 1808). Finally, communication controller 1102 instructs communication unit 303 to transmit the e-mails. The e-mail having file "PRINT 2" and image file "A.JPG" is transmitted, and the e-mail having file "PRINT3" and image file "B.JPG is transmitted (Step 1809).

As discussed above, the apparatus in accordance with embodiment 4 can transmit desirable files to desirable plural destinations according to the transmission control file. In this case, a user only specifies a print control file as a file to be transmitted, then the print control file and an image file to be printed can be transmitted. Embodiment 4 thus substantially increases convenience for the user similarly to embodiment 4.

A number of groups to be listed in the transmission control file is not limited to two; but three or more groups can be included in the transmission control file by repeating the procedure discussed above. This allows the file to be transmitted to three or more destinations.

In all the embodiments previously discussed of the present invention, instead of printing an image file, the image file may be displayed on a display device at a destination such as a monitor screen or a projector screen. An audio file can be reproduced from an audio device at a destination.

In all the embodiments previously discussed of the present invention, a file name is used as file information for specifying a file such as a print control file or a transmission control file. However, instead of the file name, an address stored in memory or in an apparatus may be used.

In all the embodiments previously discussed of the present invention, communication unit 303 may employ either wire-transmission or wireless transmission. In the wire transmission, a file may be transmitted on a telephone line via a modem. In the wireless transmission, a file may be transmitted through a mobile communication such as a cellular phone.

In all the embodiments previously discussed of the present invention, information listed in a transmission control file includes a name of a file to be transmitted, an e-mail address of a destination, an e-mail address of a sender, a telephone number of the sender, a title, a message and a name of the sender. However, the information is not limited to these items and may include other items such as an address of the sender, a date of a transmission, a time of the transmission, a date and time when the transmission control file is lastly stored and others.

In all the embodiments previously discussed of the present invention, a name of a file to be printed is listed in a print control file. However, it is not limited to a name of a file, and may includes another information such as a number of sheets to be printed, whether or not a scaling process is needed, rotating of an image, trimming, and the like.

In all the embodiments previously discussed of the present invention, a file to be printed is an image file. However, it is not limited to an image file, and may be a text file, for instance.

In all the embodiments previously discussed of the present invention, keyboard 110 is used for inputting an e-mail address. However, it is not limited to a keyboard, and an address among various mail addresses stored in the apparatus in advance may be selected by a key operation.

In all the embodiments previously discussed of the present invention, names of a print control file and a transmission control file may be specified with an absolute path or a relative path.

In all the embodiments previously discussed of the present invention, a user specifies a print control file as a file to be transmitted. However, it is not limited to this file, and for instance, a user may specify an image file or another file as a file to be transmitted, and transmits the specified file using a transmission control file.

In all the embodiments previously discussed of the present invention, a file to be transmitted is attached to an e-mail. However, it is not limited to this method. Communication unit 303 transmits data using an e-mail. However, communication unit 303 may transmit data by any modulation method or any protocol with the same effects as those of the present invention.

In all the embodiments previously discussed of the present invention, memory 101 is detachable. However, memory 101 is not necessarily detachable. For instance, memory 101 may be rigidly mounted to the apparatus. When files are transmitted, a data file as well as a transmission control file may be duplicated to another memory device detachably. Further, data and files may be exchanged between an apparatus at a sender and an apparatus at a destination via wire or wireless.

In all the embodiments previously discussed of the present invention, an apparatus for creating a print control file and a transmission control file is separated from a transmitter for transmitting files. However, they are not necessarily separated. An apparatus including both of them produces the same advantages.

In all the embodiments previously discussed of the present invention, a print control file and a transmission control file are created by one, the same apparatus. However, they may be created by different apparatuses independently.

In all the embodiments previously discussed of the present invention, a print control file, a transmission control file, and an image file are stored in a memory. However, the memory may store at least the print control file, and another memory, e.g., a hard disc, a portable storage device, or an external storage device which may be linked in a network may store other files.

In embodiments 3 and 4 of the present invention, one group includes a single piece of information for specifying one destination, and a transmitter transmits an image file specified by a print control file of which name is included in the group. One group may include information that specifies plural destinations, and an image file may be transmitted to all the plural destinations.

One group may include respective names of print control files. In this case, image files specified by the files of those names are transmitted to a destination included in the group. If the group includes plural destinations, the image files specified by the print control files can be transmitted to the plural destinations.

INDUSTRIAL APPLICABILITY

With a print image specifying apparatus of the present invention, a user, upon asking a remote third party to output image files by printing or displaying according to a print control file, specifies the print control file as a file to be transmitted in order to instruct the apparatus to transmit files necessary for printing.

The invention claimed is:

1. An image specifying apparatus for use with a transmitter that transmits a transmittable file, said image specifying apparatus comprising:
   a reading unit for reading:
   a transmission control file, and
   a print control file specified by the transmission control file read by said reading unit, wherein the print control file includes image file information and the image file information specifies the transmittable file; and
   a controller for automatically extracting the image file information from the print control file read by said reading unit and for automatically adding the extracted image file information into the transmission control file read by said reading unit.

2. The image specifying apparatus of claim 1, further comprising:
   a writing unit for writing the print control file into a memory,
   wherein said controller is operable to add another image file information into the print control file.

3. The image specifying apparatus of claim 1, wherein the transmission control file includes destination information specifying the destination device.

4. The image specifying apparatus of claim 1, wherein said controller adds, into the transmission control file, group identifying information specifying a group including the print control file information.

5. The image specifying apparatus of claim 4,
   wherein the transmission control file includes destination information specifying the destination device, the destination information being included in the group, and
   wherein the transmitter transmits the image file specified by the image file information included in the group to the destination device specified by the destination information included in the group specified by the group identifying information.

6. An image specifying apparatus for use with a transmitter that transmits a transmittable file, said image specifying apparatus comprising:
   a reading unit for reading:
   a transmission control file, and
   a print control file specified by the transmission control file read by said reading unit, wherein the print control file includes image file information and the image file information specifies the transmittable file; and
   a controller for automatically extracting the image file information from the print control file read by said reading unit and for instructing the transmitter to transmit the image file specified by the extracted image file information.

7. The image specifying apparatus of claim 6, wherein the transmission control file includes destination information specifying the destination device.

8. The image specifying apparatus of claim 6, wherein the transmission control file includes group identifying information specifying a group including the print control file information.

9. The image specifying apparatus of claim 6,
wherein the transmission control file includes group identifying information specifying a group including the print control file information and destination information, the destination information specifying the destination device, and
wherein the transmitter transmits the image file specified by the image file information to the destination device specified by the destination information included in the group specified by the group identifying information, the image file information being included in the group.

10. The image specifying apparatus of claim 2, wherein the memory is detachable.

11. A method of specifying an image, said method for use with a transmitter that transmits a transmittable file, said method comprising:
reading:
a transmission control file, and
a print control file specified by the read transmission control file, wherein the print control file includes image file information and the image file information specifies the transmittable file; and
automatically extracting the image file information from the read print control file; and
automatically adding the extracted image file information into the transmission control file.

12. The method of claim 11 further comprising:
adding another image file information into the print control file; and
writing the print control file into a memory.

13. The method of claim 11, wherein the transmission control file includes destination information specifying the destination device.

14. The method of claim 11, wherein the transmission control file includes group identifying information specifying a group including the print control file information.

15. The method of claim 14, wherein the transmission control file includes destination information specifying the destination device, the destination information being included in the group, and
wherein the method transmits the image file specified by the image file information to the destination device specified by the destination information included in the group specified by the group identifying information, the image file information being included in the group.

16. A method of specifying an image, said method for use with a transmitter that transmits a transmittable file to a destination device, said method comprising:
reading:
a transmission control file, and
a print control file specified by the read transmission control file, wherein the print control file includes image file information and the image file information specifies the transmittable file; and
automatically extracting the image file information from the read print control file; and
instructing the transmitter to transmit the image file specified by the extracted image file information to the destination device.

17. The method of claim 16, wherein the transmission control file includes destination information specifying the destination device.

18. The method of claim 16, wherein the transmission control file includes group identifying information specifying a group including the print control file information.

19. The method of claim 16 further comprising:
adding group identifying information specifying a group including the print control file information into the transmission control file;
adding destination information specifying the destination device into the group; and
transmitting the image file specified by the image file information included in the group to the destination device specified by the destination information included in the group specified by the group identifying information.

20. The image specifying apparatus of claim 6 further comprising a detachable memory.

21. The image specifying apparatus of claim 1, wherein said transmittable file is also a printable file.

22. The image specifying apparatus of claim 1, further comprising a selection unit for selecting said print control file so that transmission of said transmission control file causes transmission of said print control file.

23. The image specifying apparatus of claim 1, wherein said image file information comprises a file name of said image file.

24. The image specifying apparatus of claim 1, wherein said transmission file information comprises a file name of said file to be transmitted.

25. The image specifying apparatus of claim 6, wherein said image file information comprises a file name of said image file.

26. The image specifying apparatus of claim 6, wherein said transmission file information comprises a file name of said file to be transmitted.

27. The method of claim 11, wherein said image file information comprises a file name of said image file.

28. The method of claim 11, wherein said transmission file information comprises a file name of said file to be transmitted.

29. The method of claim 16, wherein said image file information comprises a file name of said image file.

30. The method of claim 16, wherein said transmission file information comprises a file name of said file to be transmitted.

31. An image specifying apparatus comprising:
a memory having a plurality of transmission control files, a plurality of print control files, and a plurality of image files stored therein, each of said transmission control files specifies a destination and at least one print control file among said plurality of print control files, each of said print control files having image file information that specifies at least one image file to be printed;
a reading unit operable to read at least one of the transmission control files from said memory and operable to read at least one print control file specified by the read transmission control file from said memory; and
a controller operable to automatically extract the image file information from at least one print control file read by said reading unit and to automatically add the extracted image file information into readapt least one transmission control file read by said reading unit.

32. The image specifying apparatus according to claim 31, wherein each of said transmission control files specifies name of the image files to be transmitted, sender addresses, receiver addresses, and the print control file.

33. An image specifying apparatus comprising:

a memory including:

an image file;

a transmission control file containing transmission information for transmitting the image file and containing print control file information for identifying a print control file; and the print control file identified by the print control file information contained in the transmission control file, the print control file containing image file information for identifying the image file and print information for printing the image file;

wherein the image file, the transmission control file and the print control file are stored as separate files on said memory;

a reading unit operable to read from said memory:

the transmission control file including the transmission information for transmitting the image file and the print control file information for identifying the print control file; and the print control file identified by the print control file information contained in the read transmission control file; and a controller operable to automatically extract the image file information from the print control file read by said reading unit and operable to automatically add the extracted image file information to the transmission control file read by said reading unit.

* * * * *